(12) United States Patent
Imiya et al.

(10) Patent No.: US 7,345,996 B2
(45) Date of Patent: Mar. 18, 2008

(54) DATA COMMUNICATION SYSTEM, INFORMATION PROCESSING APPARATUS, INFORMATION PROCESSING METHOD, AND PROGRAM

(75) Inventors: Daisuke Imiya, Kanagawa (JP); Masayuki Ishikawa, Chiba (JP); Takao Morita, Tokyo (JP)

(73) Assignee: Sony Corporation, Tokyo (JP)

( * ) Notice: Subject to any disclaimer, the term of this patent is extended or adjusted under 35 U.S.C. 154(b) by 794 days.

(21) Appl. No.: 10/790,006

(22) Filed: Mar. 2, 2004

(65) Prior Publication Data

US 2004/0190452 A1   Sep. 30, 2004

(30) Foreign Application Priority Data

Mar. 27, 2003  (JP) ............................. 2003-088612

(51) Int. Cl.
  H04J 1/16 (2006.01)
  H04J 3/14 (2006.01)
(52) U.S. Cl. ...................................... 370/229; 370/232
(58) Field of Classification Search ................ 370/229, 370/230, 232, 235, 468
  See application file for complete search history.

(56) References Cited

U.S. PATENT DOCUMENTS

| | | | |
|---|---|---|---|
| 4,769,811 A | * | 9/1988 | Eckberg, Jr. et al. ........ 370/236 |
| 5,029,164 A | * | 7/1991 | Goldstein et al. ........... 370/235 |
| 5,115,429 A | * | 5/1992 | Hluchyj et al. ............. 370/231 |
| 5,852,601 A | * | 12/1998 | Newman et al. ............ 370/230 |
| 6,643,496 B1 | | 11/2003 | Shimoyama et al. |
| 6,701,372 B2 | | 3/2004 | Yano et al. |
| 2002/0053053 A1 | | 5/2002 | Takeshi et al. |

FOREIGN PATENT DOCUMENTS

| | | |
|---|---|---|
| JP | 11-308271 | 11/1999 |
| JP | 11-341064 | 12/1999 |
| JP | 2000-115245 | 4/2000 |
| JP | 2002-199008 | 7/2002 |
| JP | 2002-204278 | 7/2002 |

\* cited by examiner

*Primary Examiner*—Ajit Patel
(74) *Attorney, Agent, or Firm*—Oblon, Spivak, McClelland, Maier & Neustadt, P.C.

(57) ABSTRACT

The present invention provides a system that can provide contents of reliable quality. The hold state is held until a holding time elapses. If a network congestion is detected within the holding time, the state is changed to a down state. When the holding time elapses, the state is changed to an up state. If it is found that there is no network congestion in the down state, the state is changed to the hold state. If it is found in the up state that the transmission rate reaches the maximum bit rate, the state is changed to the hold state. If any network congestion is detected in the up state, the state is changed to the down state.

11 Claims, 16 Drawing Sheets

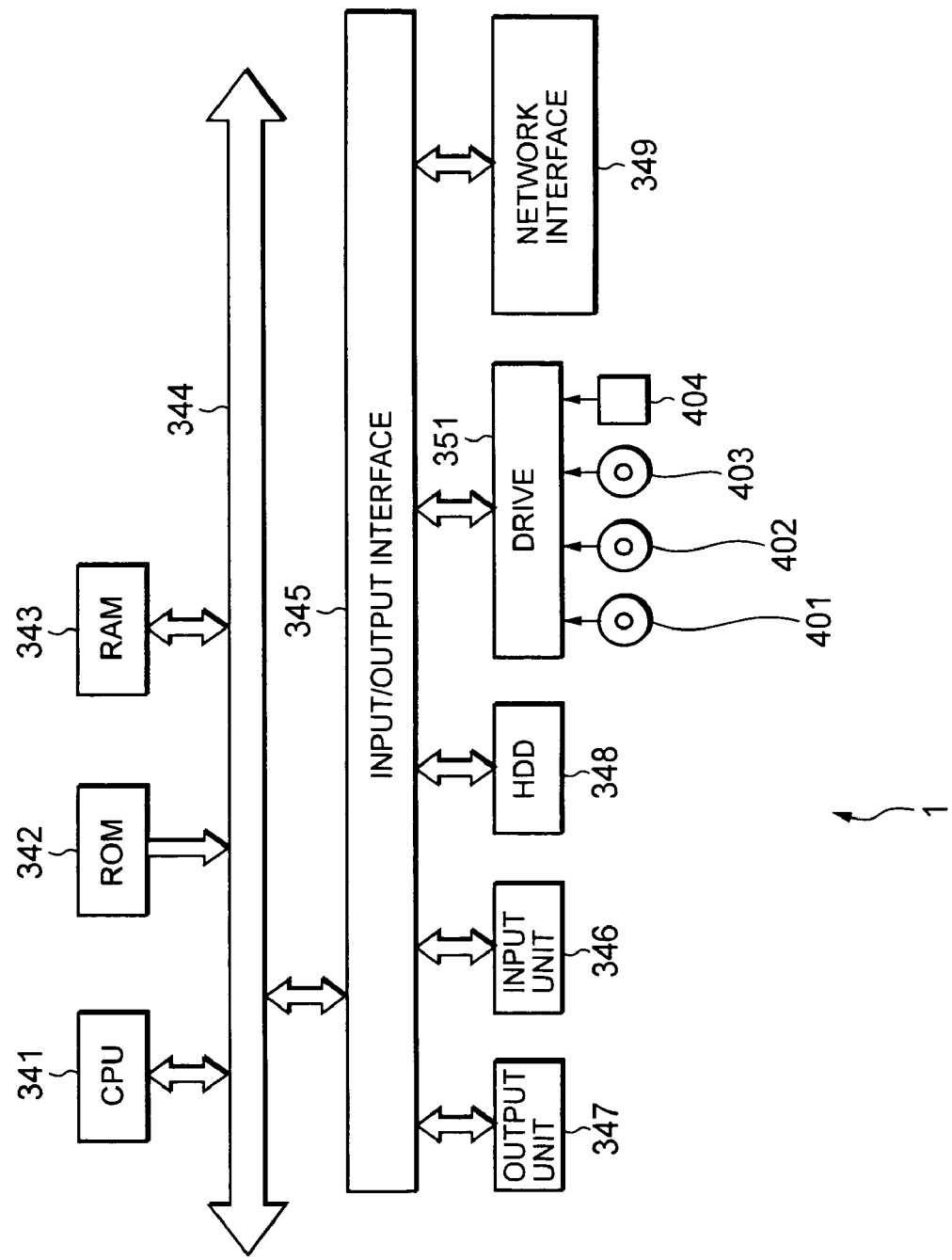

DATA COMMUNICATION SYSTEM, INFORMATION PROCESSING APPARATUS, INFORMATION PROCESSING METHOD, AND PROGRAM

CROSS-REFERENCE TO RELATED APPLICATIONS

This application claims priority from Japanese Priority Document No. 2003-088612, filed on Mar. 27, 2003 with the Japanese Patent Office, which document is hereby incorporated by reference.

BACKGROUND OF THE INVENTION

1. Field of the Invention

The present invention relates to a data communication system, an information processing apparatus, an information processing method, and a program, and more particularly to a data communication system, an information processing apparatus, an information processing method, and a program that can provide images of reliable quality over a network.

2. Description of Related Art

As an adaptive rate control method for use in data transmission/reception using RTP (Real Time Transport Protocol)/RTCP (RTP Control Protocol), a method is proposed that allows an apparatus of a data receiving side to estimate the data transmission status at an apparatus of a data transmitting side and to control the transmission rate based on information described in an RR (Receiver Report) packet of the RTCP that notifies to the apparatus of the data transmitting side information on a packet loss rate, jitters, and so on. For example, it is described in Japanese Laid-Open Patent JP2002-204278A.

Another proposed method is that the apparatus of the data transmitting side detects a network congestion based on an arrival delay of a packet, and controls the data transmission rate based on the detection result. For example, it is described in Japanese Laid-Open Patent JPH11-308271.

A still another proposed method is that an optimum data transmission rate is being sought by increasing or decreasing the data transmission rate of the transmitting side. For example, it is described in Japanese Laid-Open Patent JPH11-341064.

Like the method disclosed in the published JPH11-308271, this method basically uses a SR (Sender Report) packet and an RR packet of the RTCP to allow the transmitting side to detect a transmission delay of a packet (RTT based delay) based on information from the receiving side for controlling the transmission rate.

A still another technology is that the data receiving side estimates the transmission band of a network and, based on the estimation, the data receiving side transmits a transmission control instruction to the data transmitting side for controlling the data transmission rate. For example, it is described in Japanese Laid-Open Patent JP2000-115245.

SUMMARY OF THE INVENTION

However, all methods described above basically increase the transmission rate, decrease the transmission rate when a network congestion occurs and, after a while, increase the transmission rate again to dynamically control the transmission rate. As a result, a congestion occurs regularly because the transmission rate is increased until the network becomes congested. There exists a problem that, when image data is sent and received over a network, the quality of supplied images tends to degrade. In view of the foregoing, there is a need for a system and a method that provide contents of reliable quality.

A data communication system according to the present invention comprises a first information processing apparatus for transmitting data over a network and a second information processing apparatus for receiving the data from the first information processing apparatus over the network, wherein the first information processing apparatus measures an upstream transmission rate of an access link, the second information processing apparatus measures a downstream transmission rate of an access link, wherein one of the first information processing apparatus and the second information processing apparatus, which dynamically controls a transmission rate, receives the transmission rate measured by another information processing apparatus, determines a maximum value of the transmission rate based on a smaller of the two transmission rates, and determines the transmission rate within a range of the maximum value, and wherein the first information processing apparatus transmits the data to the second information processing apparatus at the determined transmission rate.

An information processing apparatus according to the present invention comprises acquisition means for acquiring first information of a transmission rate from another information processing apparatus; reference value setting means for setting a maximum reference value of a transmission rate based on the first information acquired from the other information processing apparatus and on second information of a transmission rate of the own information processing apparatus; and transmission rate controlling means for controlling a transmitting or receiving transmission rate of the data to or from the other information processing apparatus within a range of the maximum reference value set by the reference value setting means.

When the data is sent to the other information processing apparatus, the reference value setting means selects a smaller one of the maximum transmission rate of the downstream transmission line of the other information processing apparatus, which is acquired as the first information, and the maximum transmission rate of the upstream transmission line of the own information processing apparatus and is able to set the maximum reference value based on the selected transmission rate.

The reference value setting means further selects a smaller one of the maximum bit rate of a reception capability of the other information processing apparatus, which is acquired as the first information, and the maximum bit rate of a transmission capability of the own information processing apparatus and is able to set the maximum reference value based on the smaller one of the selected bit rate and the selected transmission rate.

When the data is received from the other information processing apparatus, the reference value setting means sets the maximum reference value of the transmission rate based on a smaller one of the maximum transmission rate of the upstream transmission line of the other information processing apparatus, which is acquired as the first information, and the maximum transmission rate of the downstream transmission line of the own information processing apparatus.

The reference value setting means further selects a smaller one of the maximum bit rate of a transmission capability of the other information processing apparatus, which is acquired as the first information, and the maximum bit rate of a reception capability of the information processing apparatus and is able to set the maximum reference value based on the smaller one of the selected bit rate and the selected transmission rate.

The reference value setting means further sets the minimum reference value of the transmission rate, and the transmission rate control means controls the transmitting or receiving transmission rate of the data to or from the other information processing apparatus within a range between the maximum reference value and the minimum reference value set by the reference value setting means.

When the transmission rate is decreased, the transmission rate control means is able to change a decreasing width in the transmission rate based on a proportion of the transmission rate to the maximum reference value. The transmission rate control means is able to increase the transmission rate in such a way that the time until the transmission rate reaches the maximum reference value becomes a given length of time.

An information processing method according to the present invention comprises an acquisition step of acquiring first information on a transmission rate from another information processing apparatus; a reference value setting step of setting a maximum reference value of a transmission rate based on the first information acquired from the other information processing apparatus and on second information on a transmission rate of the own information processing apparatus; and a transmission rate controlling step of controlling a transmitting or receiving transmission rate of the data to or from the other information processing apparatus within a range of the maximum reference value set by processing of the reference value setting step.

A program recorded on a recording medium according to the present invention comprises an acquisition step of acquiring first information on a transmission rate from another information processing apparatus; a reference value setting step of setting a maximum reference value of a transmission rate based on the first information acquired from the other information processing apparatus and on second information on a transmission rate of the own information processing apparatus; and a transmission rate controlling step of controlling a transmitting or receiving transmission rate of the data to or from the other information processing apparatus within a range of the maximum reference value set by processing of the reference value setting step.

A program according to the present invention causes a computer to execute an acquisition step of acquiring first information on a transmission rate from another information processing apparatus; a reference value setting step of setting a maximum reference value of a transmission rate based on the first information acquired from the other information processing apparatus and on second information on a transmission rate of the own information processing apparatus; and a transmission rate controlling step of controlling a transmitting or receiving transmission rate of the data to or from the other information processing apparatus within a range of the maximum reference value set by processing of the reference value setting step.

According to the data communication system of the present invention, the first information processing apparatus measures an upstream transmission rate of an access link, the second information processing apparatus measures a downstream transmission rate of an access link, one of the first processing apparatus and the second information processing apparatus, which dynamically controls a transmission rate, determines a maximum value of the transmission rate and determines the transmission rate within a range of the maximum value, and first information processing apparatus transmits the data to the second information processing apparatus at the determined transmission rate.

According to the information processing apparatus, the method, the recording medium, and the program of the present invention, the first information on the transmission rate is acquired from another information processing apparatus, the maximum reference value of the transmission rate is set based on the first information acquired from the other information processing apparatus and on the second information on the transmission rate of the own information processing apparatus, and the transmitting or receiving transmission rate of the data to or from the other information processing apparatus is controlled within a range of the maximum reference value that is set.

In a first aspect of the present invention, two apparatuses can transmit and receive data as described above. In particular, a system capable of transmitting and receiving contents of reliable quality can be implemented. The transmission rate can be determined based on the upstream transmission rate of the transmitting side and the downstream transmission rate of the receiving side.

In a second aspect of the present invention, data can be sent or received. In particular, contents having reliable quality can be sent or received. The contents can be provided at a transmission rate suitable for individual contents.

Before describing on embodiment of the present invention, an example of the correspondence between the constituent features described in the claims and the examples in the description of the preferred embodiment of the present invention is as described below. The description below is to confirm that examples supporting the invention described in the claims are included in the description of the preferred embodiment. Therefore, even if there is an example included in the description of the preferred embodiment but not described here as an example corresponding to a constituent feature, it does not mean that the example does not correspond to the constituent feature. Conversely, even if an example is described here as an example corresponding to a constituent feature, it does not mean that the example does not correspond to constituent features other than the constituent feature.

It is to be understood that the description below does not mean that the inventions corresponding to the examples included in the description of the preferred embodiment are all described in the claims. In other words, the description below does not deny the presence of an invention, which corresponds to an example included in the description of the preferred embodiment but not included in the claims of this application, that is, the presence of an invention that will be applied in future as a divisional application or added by an amendment.

That is, a data communication system according to one aspect of the present invention includes a first information processing apparatus (for example, an information processing apparatus 1-1 in FIG. 1) for transmitting data over a network and a second information processing apparatus (for example, an information processing apparatus 1-2 in FIG. 1) for receiving the data from the first information processing apparatus over the network, wherein the first information processing apparatus measures an upstream transmission rate of an access link (for example, step S121 to step S123 in FIG. 10), wherein the second information processing apparatus measures a downstream transmission rate of an access link (for example, step S101 to step S104 in FIG. 9), wherein one of the first information processing apparatus and the second information processing apparatus, which dynamically controls a transmission rate (for example, the information processing apparatus 1-2 in FIG. 1), receives the transmission rate measured by another information processing apparatus, determines a maximum value of the transmission rate based on a smaller one of the two transmission rates (for example, step S143 in FIG. 11), and determines the transmission rate within a range of the maximum value (for example, in step S48 and step S52 in FIG. 5), and wherein the first information processing apparatus transmits the data to the second information processing apparatus at the determined transmission rate (for example, step S3 in FIG. 3).

An information processing apparatus according to another aspect of the invention (for example, the information processing apparatus 1-2 in FIG. 1) includes acquisition means (for example, a data receiving unit 41 in FIG. 2 that executes processing in step S142 in FIG. 11) for acquiring first information on a transmission rate from another information processing apparatus (for example, an upstream transmission rate of the information processing apparatus 1-1 in FIG. 1), reference value setting means (for example, a maximum route rate determination unit 51 in FIG. 2 that executes processing in step S75 or step S76 in FIG. 8) for setting a maximum reference value of a transmission rate based on the first information acquired from the other information processing apparatus and on second information on a transmission rate of the information processing apparatus (for example, a downstream transmission rate of the information processing apparatus 1-2 in FIG. 1), and transmission rate controlling means (for example, the transmission rate setting unit 46 in FIG. 2 that executes processing in step S48 or step S52 in FIG. 5) for controlling a transmitting or receiving transmission rate of the data to or from the other information processing apparatus within a range of the maximum reference value set by the reference value setting means.

When the data is sent to the other information processing apparatus, the reference value setting means of the information processing apparatus selects a smaller one of a maximum transmission rate of a downstream transmission line of the other information processing apparatus, which is acquired as the first information, and a maximum transmission rate of an upstream transmission line of the information processing apparatus and sets the maximum reference value based on the selected transmission rate (for example, step S143 in FIG. 11).

The reference value setting means of the information processing apparatus further selects a smaller one of a maximum bit rate of a reception capability of the other information processing apparatus, which is acquired as the first information, and a maximum bit rate of a transmission capability of the information processing apparatus (for example, step S163 in FIG. 12) and sets the maximum reference value based on a smaller one of the selected bit rate and the selected transmission rate (for example, step S74 to step S76 in FIG. 5).

When the data is received from the other information processing apparatus, the reference value setting means of the information processing apparatus sets the maximum reference value of the transmission rate based on a smaller one of a maximum transmission rate of an upstream transmission line of the other information processing apparatus, which is acquired as the first information, and a maximum transmission rate of a downstream transmission line of the information processing apparatus (for example, step S143 in FIG. 11).

The reference value setting means of the information processing apparatus further selects a smaller one of a maximum bit rate of a transmission capability of the other information processing apparatus, which is acquired as the first information, and a maximum bit rate of a reception capability of the information processing apparatus (for example, step S163 in FIG. 12) and sets the maximum reference value based on a smaller one of the selected bit rate and the selected transmission rate (for example, step S74 to step S76 in FIG. 5).

The reference value setting means of the information processing apparatus further sets a minimum reference value of the transmission rate (for example, step S77 in FIG. 5), and the transmission rate control means controls the transmitting or receiving transmission rate of the data to or from the other information processing apparatus within a range between the maximum reference value and the minimum reference value set by the reference value setting means (for example, step S47, step S48, step S51, or step S52).

When the transmission rate is decreased, the transmission rate control means of the information processing apparatus changes a decreasing width in the transmission rate based on a proportion of the transmission rate to the maximum reference value (for example, it changes as shown in FIG. 6).

The transmission rate control means is able to increase the transmission rate in such a way that the time until the transmission rate reaches the maximum reference value becomes a given length of time (for example, it increases the rate as shown in FIG. 7).

An information processing method of the present invention comprises an acquisition step of acquiring first information on a transmission rate from another information processing apparatus (for example, step S142 in FIG. 11), a reference value setting step of setting a maximum reference value of a transmission rate based on the first information acquired from the other information processing apparatus and on second information on a transmission rate of the own information processing apparatus (for example, step S75 or step S76 in FIG. 8), and a transmission rate controlling step of controlling a transmitting or receiving transmission rate of the data to or from the other information processing apparatus within a range of the maximum reference value set by processing of the reference value setting step (for example, step S48 or step S52 in FIG. 5).

A recording medium of the present invention comprises an acquisition step of acquiring first information on a transmission rate from another information processing apparatus (for example, step S142 in FIG. 11), a reference value setting step of setting a maximum reference value of a transmission rate based on the first information acquired from the other information processing apparatus and on second information on a transmission rate of the own information processing apparatus (for example, step S75 or step S76 in FIG. 8), and a transmission rate controlling step of controlling a transmitting or receiving transmission rate of the data to or from the other information processing apparatus within a range of the maximum reference value set by processing of the reference value setting step (for example, step S48 or step S52 in FIG. 5).

A program according to the present invention causes a computer to execute an acquisition step of acquiring first information on a transmission rate from another information processing, apparatus (for example, step S142 in FIG. 11), a reference value setting step of setting a maximum reference value of a transmission rate based on the first information acquired from the other information processing apparatus and on second information on a transmission rate of the own information processing apparatus (for example, step S75 or step S76 in FIG. 8), and a transmission rate controlling step of controlling a transmitting or receiving transmission rate of the data to or from the other information processing apparatus within a range of the maximum reference value set by processing of the reference value setting step (for example, step S48 or step S52 in FIG. 5).

BRIEF DESCRIPTION OF THE DRAWINGS

In the accompanying drawings:

FIG. 16 is a block diagram showing an example of the configuration of the information processing apparatus in FIG. 1.

DESCRIPTION OF THE PREFERRED EMBODIMENT

Figure 1:
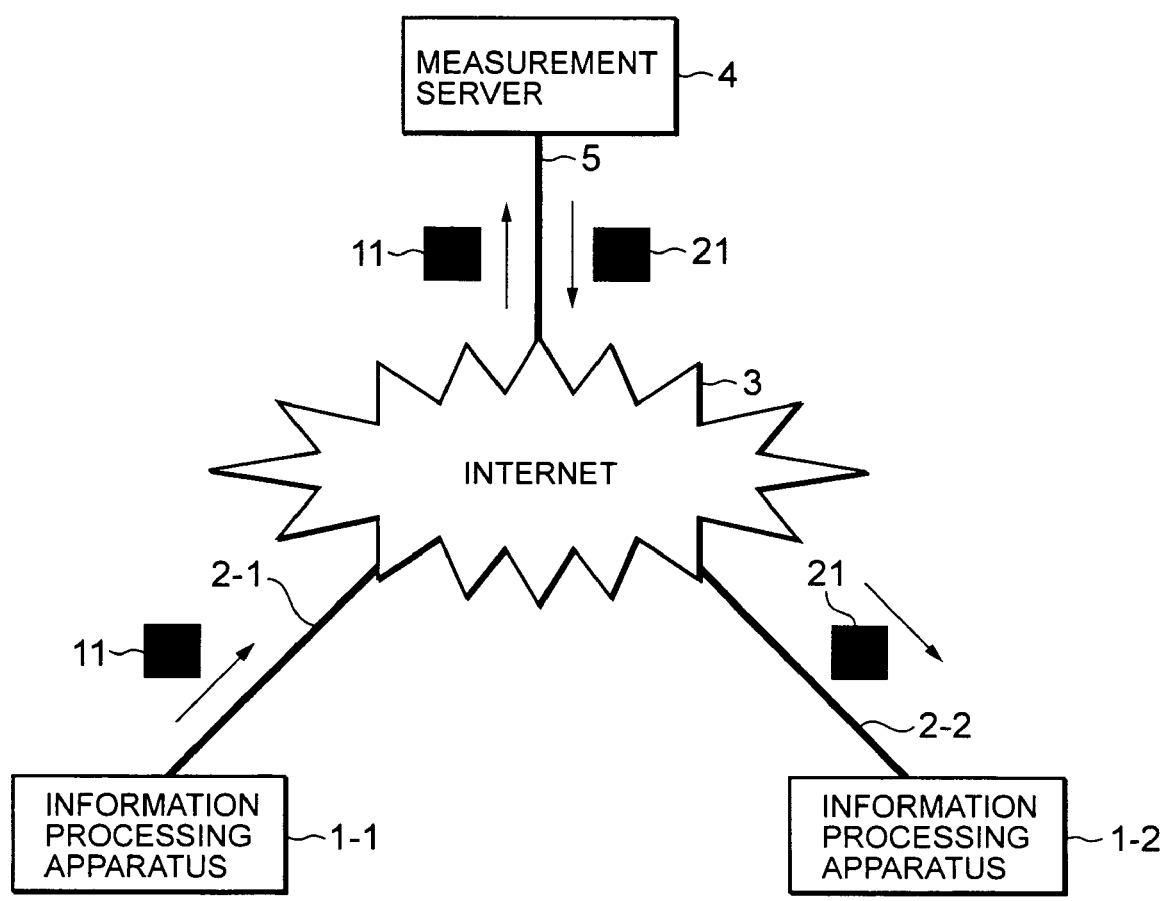
FIG. 1 is a diagram showing a communication system according to the present invention.

An embodiment of the present invention will be described below with reference to the drawings. FIG. 1 is a diagram showing a communication system according to the present invention.

Referring now to FIG. 1, an information processing apparatus 1-1, an information processing apparatus 1-2, and a measurement server 4 are connected respectively to the Internet 3 used as a network in this embodiment. The information processing apparatus 1-1 is connected to the Internet 3 via an access link 2-1, and the information processing apparatus 1-2 is connected to the Internet 3 via an access link 2-2. The access link 2-1 and the access link 2-2 are links such as an ISDN (Integrated Service Digital Network), an ADSL (Asymmetric Digital Subscriber Line) and the like.

The measurement server 4 connected to the Internet 3 via a backbone link 5 is a server used by the information processing apparatuses 1-1 and 1-2 to measure the link speed (transmission rate) of the corresponding access links 2-1 and 2-2.

To measure the upstream transmission rate, the information processing apparatus 1-1 transmits a packet 11 of a predetermined size to the measurement server 4 via the access link 2-1 and the Internet 3. The information processing apparatus 1-1 calculates the upstream transmission rate based on the speed when the packet 11 is sent to the measurement server 4. To measure the downstream transmission rate, the information processing apparatus 1-2 receives a packet 21 of a predetermined size from the measurement server 4 via the Internet 3 and the access link 2-2. The information processing apparatus 1-2 calculates the downstream transmission rate based on the speed when the data packet 21 is received from the measurement server 4.

When data is sent from the information processing apparatus 1-2 to the information processing apparatus 1-1, the upstream speed of the information processing apparatus 1-2 and the downstream speed of the information processing apparatus 1-1 are measured in the same way.

In the description below, the information processing apparatus 1-1 and the information processing apparatus 1-2, each of which is an apparatus such as a personal computer, are called simply an information processing apparatus 1 if they need not be distinguished individually, and similarly, the access link 2-1 and the access link 2-2 are called simply as an access link 2 if they need not be distinguished individually.

Figure 2:
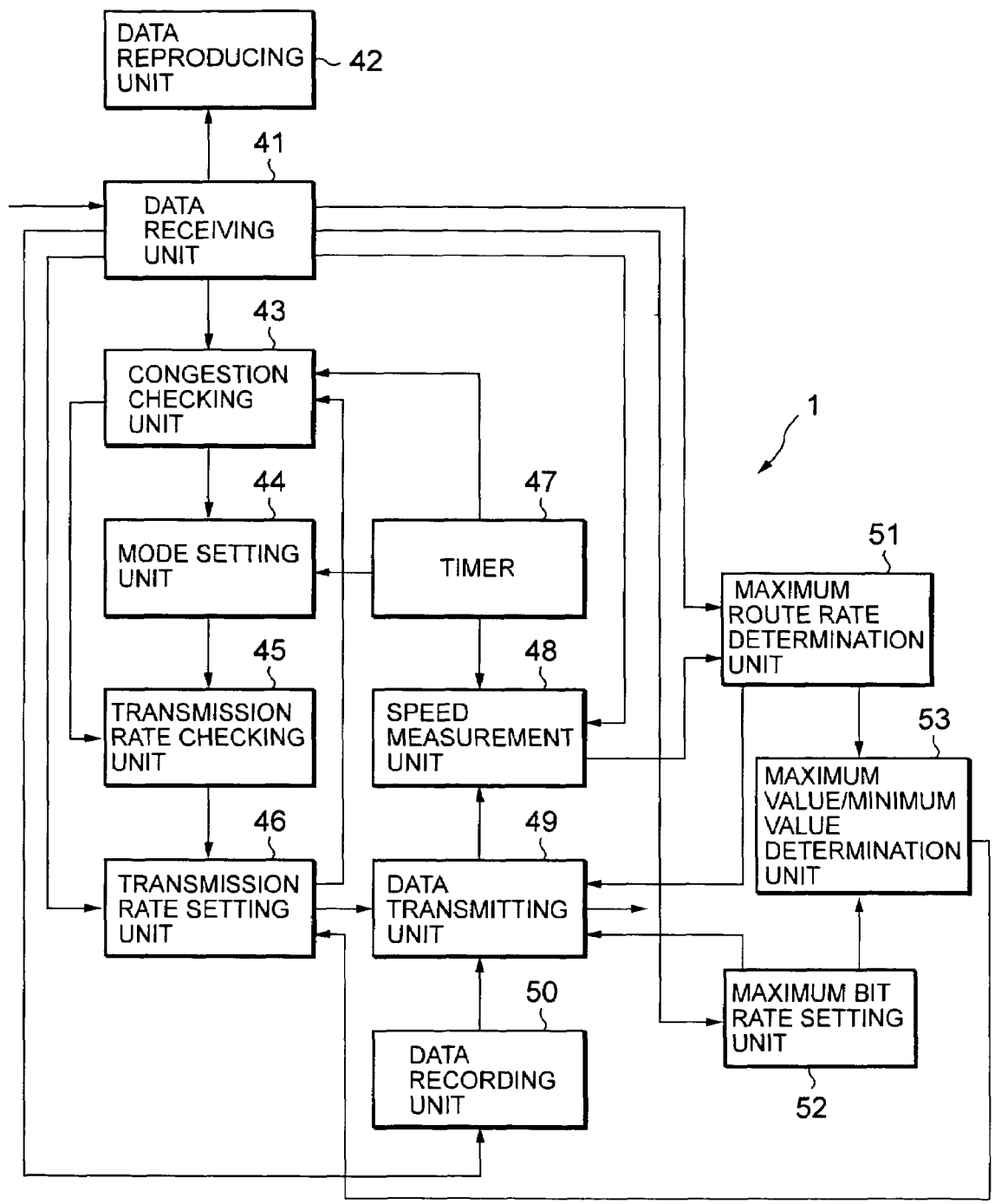
FIG. 2 is a block diagram showing the functional configuration of an information processing apparatus in FIG. 1.

FIG. 2 is a functional block diagram showing the functional configuration of the information processing apparatus 1. The information processing apparatus 1 has a data transmitting function and a data receiving function.

The information processing apparatus 1 comprises a data receiving unit 41, a data reproducing unit 42, a congestion checking unit 43, a mode setting unit 44, a transmission rate checking unit 45, a transmission rate setting unit 46, a timer 47, a speed measurement unit 48, a data transmitting unit 49, a data recording unit 50, a maximum route rate determination unit 51, a maximum bit rate setting unit 52, and a maximum value/minimum value determination unit 53.

The data receiving unit 41 receives data via the Internet 3 and the access link 2. The received data is supplied to the data reproducing unit 42, the congestion checking unit 43, the transmission rate setting unit 46, speed measurement unit 48, the data recording unit 50, the maximum route rate determination unit 51, and the maximum bit rate setting unit 52.

Based on the data received from the data receiving unit 41 and information received from the transmission rate setting unit 46, the congestion checking unit 43 checks if there is a congestion. The checking result generated by the congestion checking unit 43 is supplied to the mode setting unit 44 and the transmission rate checking unit 45.

The mode setting unit 44 sets a predetermined mode based on the checking result generated by the congestion checking unit 43 and a time of day clocked by the timer 47. The mode (state) that is set is one of the three modes such as a hold state, an up state, and a down state. The mode that is set is supplied to the transmission rate checking unit 45. The details of this mode (state) will be described later with reference to FIG. 4.

The transmission rate checking unit 45 checks the transmission rate based on the checking result generated by the congestion checking unit 43 and the mode (state) set by the mode setting unit 44. For example, the transmission rate checking unit 45 checks if the current transmission rate is the minimum value of a rate control or if the current transmission rate is the maximum value of the rate control. The checking result of the transmission rate, generated by the transmission rate checking unit 45, is supplied to the transmission rate setting unit 46.

In this system, the transmission rate is controlled dynamically by the receiving side. Therefore, the transmission rate setting unit 46, when it is a transmitting side, checks the reception rate of received data which is sent from the other information processing apparatus (the information processing apparatus of the receiving side) and received by the data receiving unit 41, and sets the current transmission rate (The transmission rate is set equal to the reception rate). The transmission rate that is set is supplied to the congestion checking unit 43 and the data transmitting unit 49.

The timer 47 executes the clocking operation and outputs a clocked time to the mode setting unit 44, the speed measurement unit 48, and the congestion checking unit 43. The speed measurement unit 48 measures the downstream transmission rate (the transmission rate at which data is received) based on the current time of day obtained from the timer 47 and the amount of data received by the data receiving unit 41. The speed measurement unit 48 also measures the upstream transmission rate (the transmission rate at which data is sent) based on the current time of day obtained from the timer 47 and the amount of data sent by the data transmitting unit 49. The measured speed is outputted to the maximum route rate determination unit 51.

The data transmitting unit 49, when it is the transmitting side, reads content data (for example, sound data, image data, text data, or their combination) recorded in the data recording unit 50 based on the transmission rate set by the transmission rate setting unit 46 and transmits the data to the information processing apparatus of the receiving side as stream data. In addition, when the upstream transmission rate is measured, the data transmitting unit 49 outputs information on the transmitting data (amount of data) to the speed measurement unit 48. Also, the data transmitting unit 49, when it is a receiving side, transmits the maximum route rate determined and supplied by the maximum route rate determination unit 51, and the maximum bit rate, set and supplied by the maximum bit rate setting unit 52, to the information processing apparatus of the transmitting side.

The data recording unit 50, when it is the receiving side, records therein the content data received by the data receiving unit 41. The data recording unit 50, when it is the transmitting side, reads the content data recorded therein and outputs it to the data transmitting unit 49.

Figure 11:
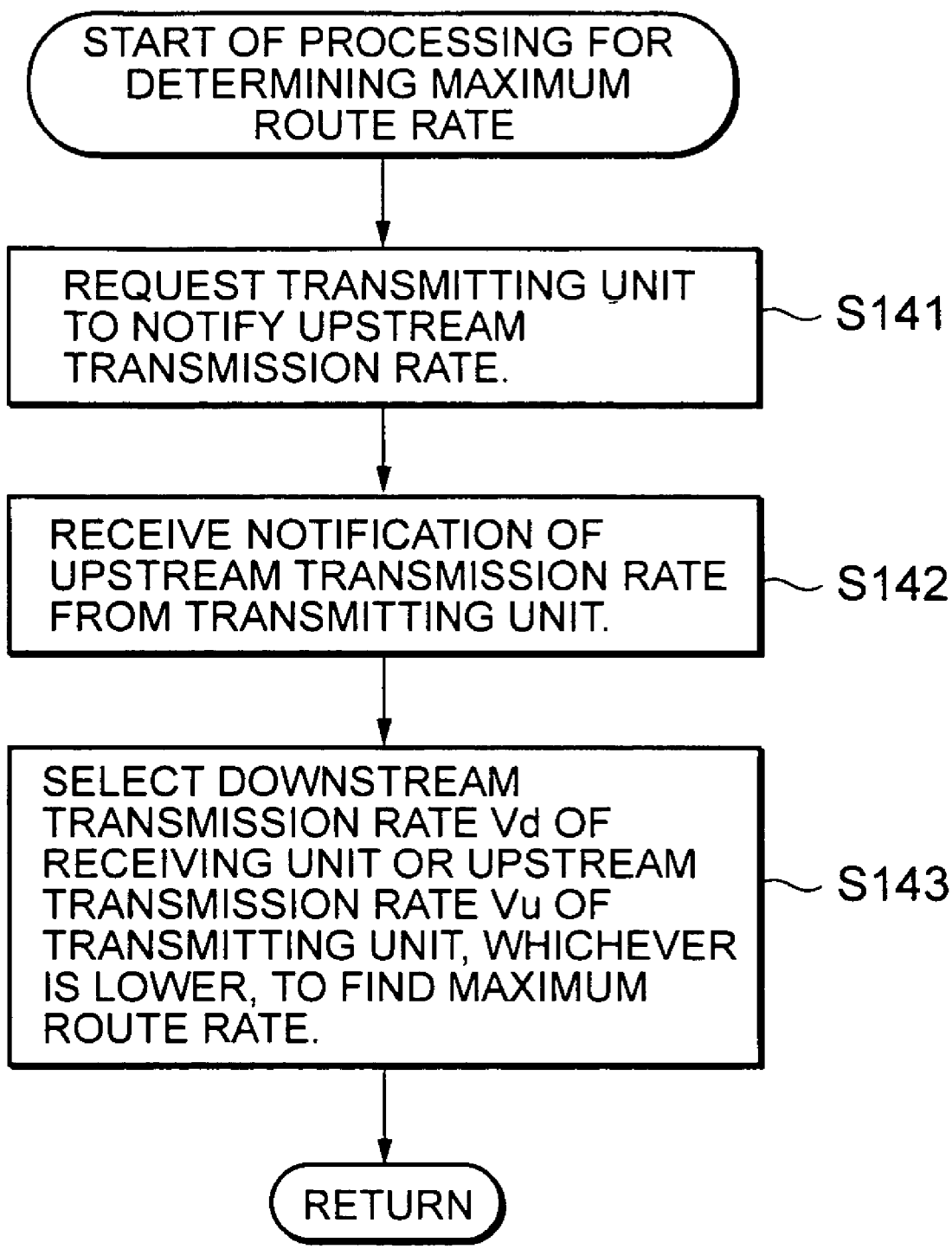
FIG. 11 is a flowchart showing processing for determining a maximum route rate.

The maximum route rate determination unit 51, when it is the receiving side, determines the maximum rate of a route based on information on the upstream transmission rate of the transmitting side received by the data receiving unit 41 and on the speed measured by the speed measurement unit 48 (the downstream transmission rate thereof, namely of the receiving side) to determine the maximum rate of the route (This will be described later with reference to FIG. 11). The determined maximum route rate is outputted to the data transmitting unit 49 and to the maximum value/minimum value determination unit 53.

The maximum bit rate setting unit 52 sets the maximum bit rate of a stream based on the maximum bit rate of the transmitting side received by the data receiving unit 41 and on the maximum bit rate thereof which is capable of receiving, and outputs thus set maximum bit rate to the data transmitting unit 49 and the maximum value/minimum value determination unit 53 (This will be described later with reference to FIG. 12).

Figure 8:
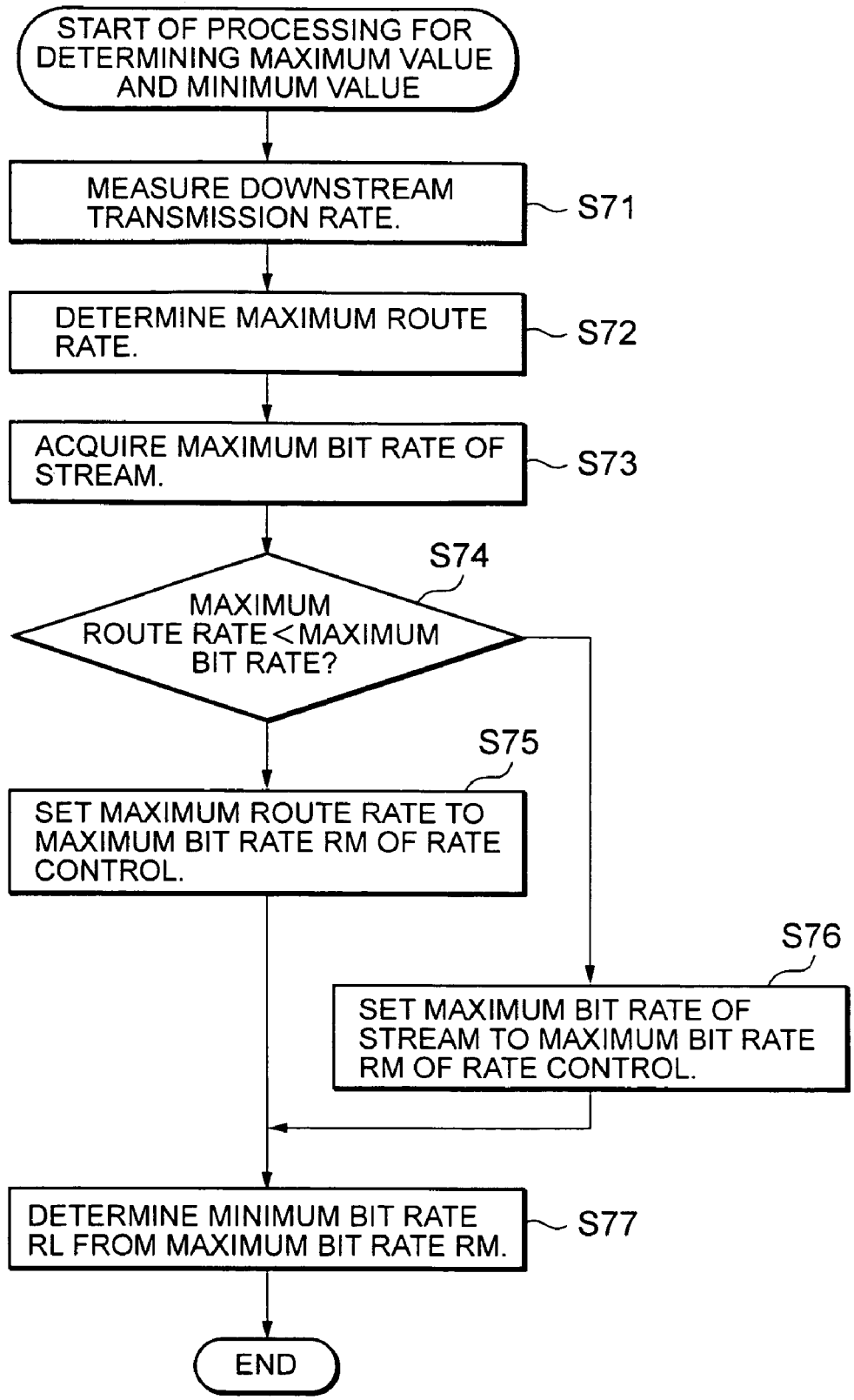
FIG. 8 is a flowchart showing processing for determining a minimum value and a maximum value.

The maximum value/minimum value determination unit 53 determines the maximum bit rate and the minimum bit rate of the stream based on the maximum route rate determined by the maximum route rate determination unit 51 and the maximum bit rate set by the maximum bit rate setting unit 52 (This will be described later with reference to FIG. 8). Thus determined maximum bit rate and the minimum bit rate are outputted to the transmission rate setting unit 46.

The following describes how the apparatus of the receiving side (for example, the information processing apparatus 1-2) sets the transmission rate in the apparatus of the transmitting side (for example, the information processing apparatus 1-1).

Figure 3:
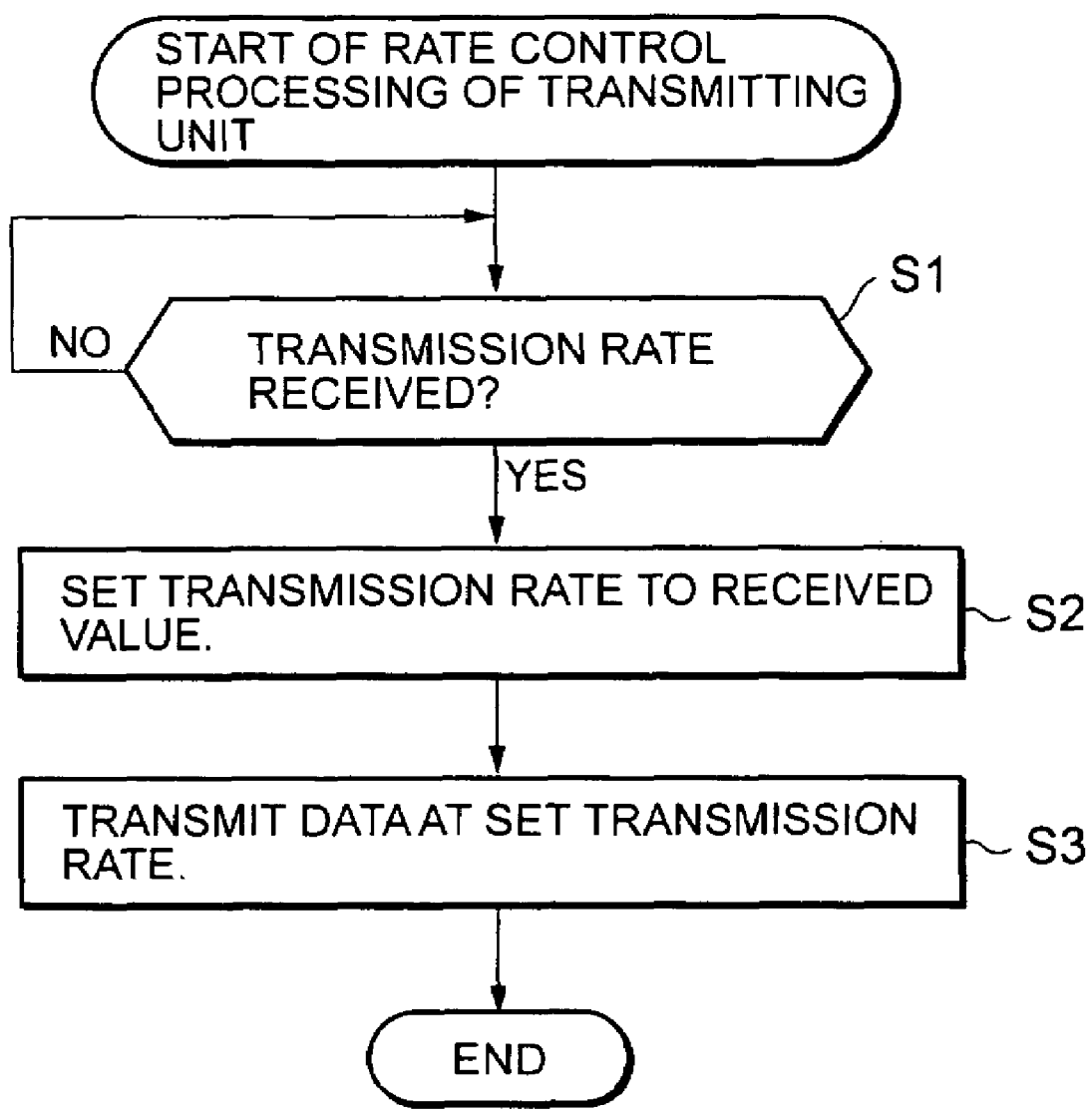
FIG. 3 is a flowchart showing rate control processing executed by a transmitting unit.

FIG. 3 is a flowchart showing rate control processing of the transmitting side. For example, when the information processing apparatus 1-1 transmits predetermined data (data packet) to the information processing apparatus 1-2, the information processing apparatus 1-1 is the transmitting side and the information processing apparatus 1-2 is the receiving side. Therefore, the information processing apparatus 1-1 of the transmitting side executes the processing shown in FIG. 3.

In step S1, the data receiving unit 41 of the information processing apparatus 1-1 checks if the transmission rate is received from the information processing apparatus 1-2 of the receiving side and waits until the transmission rate is received. That is, because the transmission rate is controlled by the receiving side in this system, the transmission rate is sent from the information processing apparatus 1-2 of the receiving side (step S49 or step S53 in FIG. 5 that will be described later), so that the data receiving unit 41 of the information processing apparatus 1-1 at the transmitting side receives this transmission rate via the Internet 3.

If it is found that the transmission rate is received in step S1, the transmission rate setting unit 46 sets, in step S2, the transmission rate to the value (received transmission rate value) received by the data receiving unit 41.

In step S3, the data transmitting unit 49 reads content data recorded in the data recording unit 50 and transmits the data to the information processing apparatus 1-2 of the receiving side via the Internet 3 at the transmission rate that is set by the processing in step S2.

In this way, the information processing apparatus 1-1 of the transmitting side controls the transmission rate based on the transmission rate acquired from the information processing apparatus 1-2 of the receiving side. Although the transmitting side is set to be the information processing apparatus 1-1 in the above example, it is of course possible that the information processing apparatus 1-2 is set to be the transmitting side. In that case, the information processing apparatus 1-2 executes the processing shown in FIG. 3.

Figure 4:
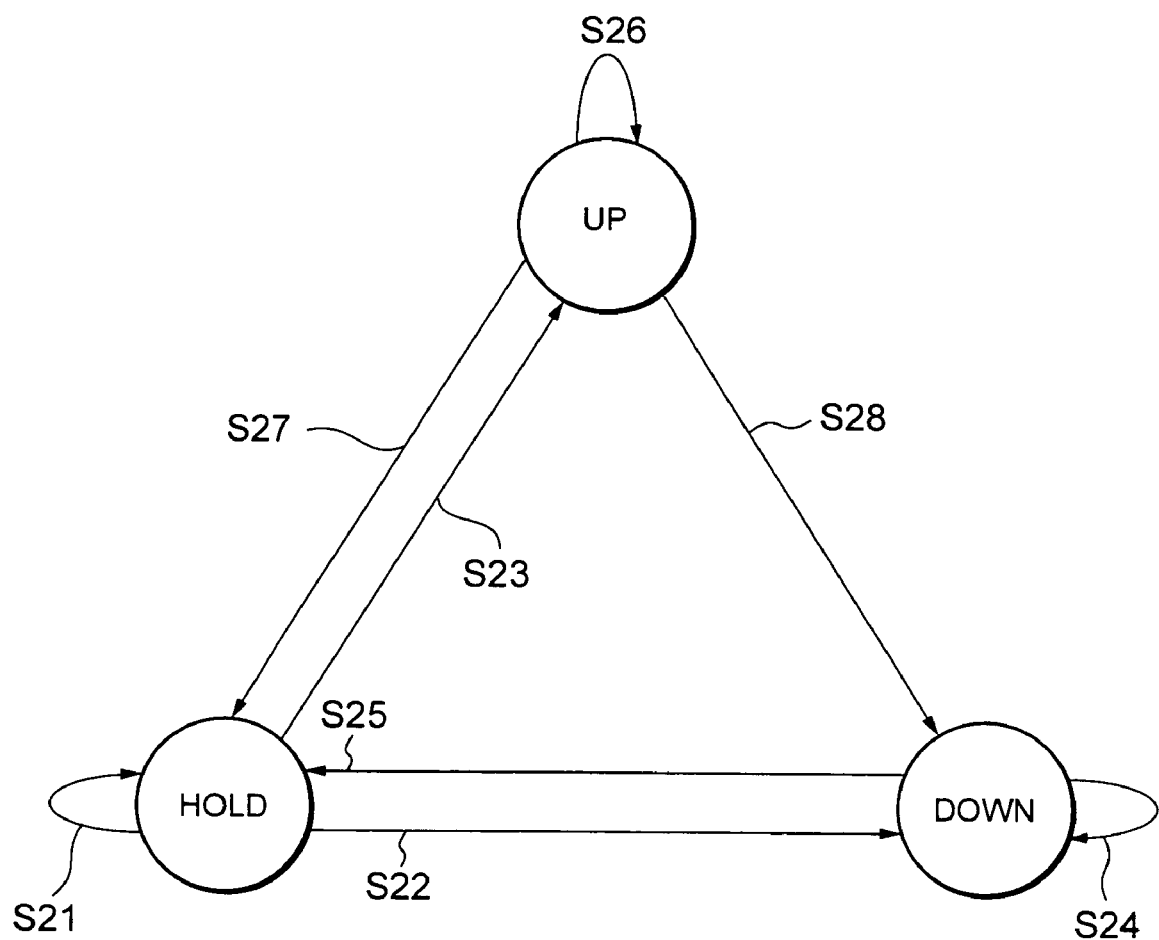
FIG. 4 is a diagram showing state transition.

Next, the following describes the dynamic control of the transmission rate in the apparatus of the receiving side. In this system, the mode setting unit 44 controls the transmission rate by putting the transmission rate in one of three modes (states) as shown in FIG. 4.

The three modes (states) are UP state in which the data transmission rate is increased (hereinafter called an up state), DOWN state in which the data transmission rate is decreased (hereinafter called a down state), and HOLD state in which the data transmission rate is not changed (hereinafter called a hold state).

At the start of control, the state is in the hold state. In step S21, the hold state is held until a pre-set holding time elapses. If a network congestion is detected within the holding time, the state is changed to the down state in step S22. After the holding time elapses, the state is changed to the up state in step S23.

In the down state, the transmission rate is decreased. When the transmission rate reaches a pre-set minimum value, the transmission rate cannot be decreased any more. Therefore, though the transmission rate is virtually held, the state still remains in the down state. If a network congestion occurs in the down state, the state remains in the down state in step S24. If a network congestion is resolved in the down state, the state is changed from the down state to the hold state in step S25.

In the up state, the transmission rate is increased. If it is found there is no congestion in the network in the up state, the state is held in the up state in step S26. If it is found that the transmission rate reaches a pre-set maximum bit rate in the up state, the holding time is set to an infinite value (∞) in step S27 and the state is changed to the hold state. If a network congestion is detected in the up state, the state is changed to the down state in step S28.

By controlling the data transmission rate based on the three states as described above, the data transmission rate is optimally controlled according to the condition of the data transmission line at that time.

Figure 5:
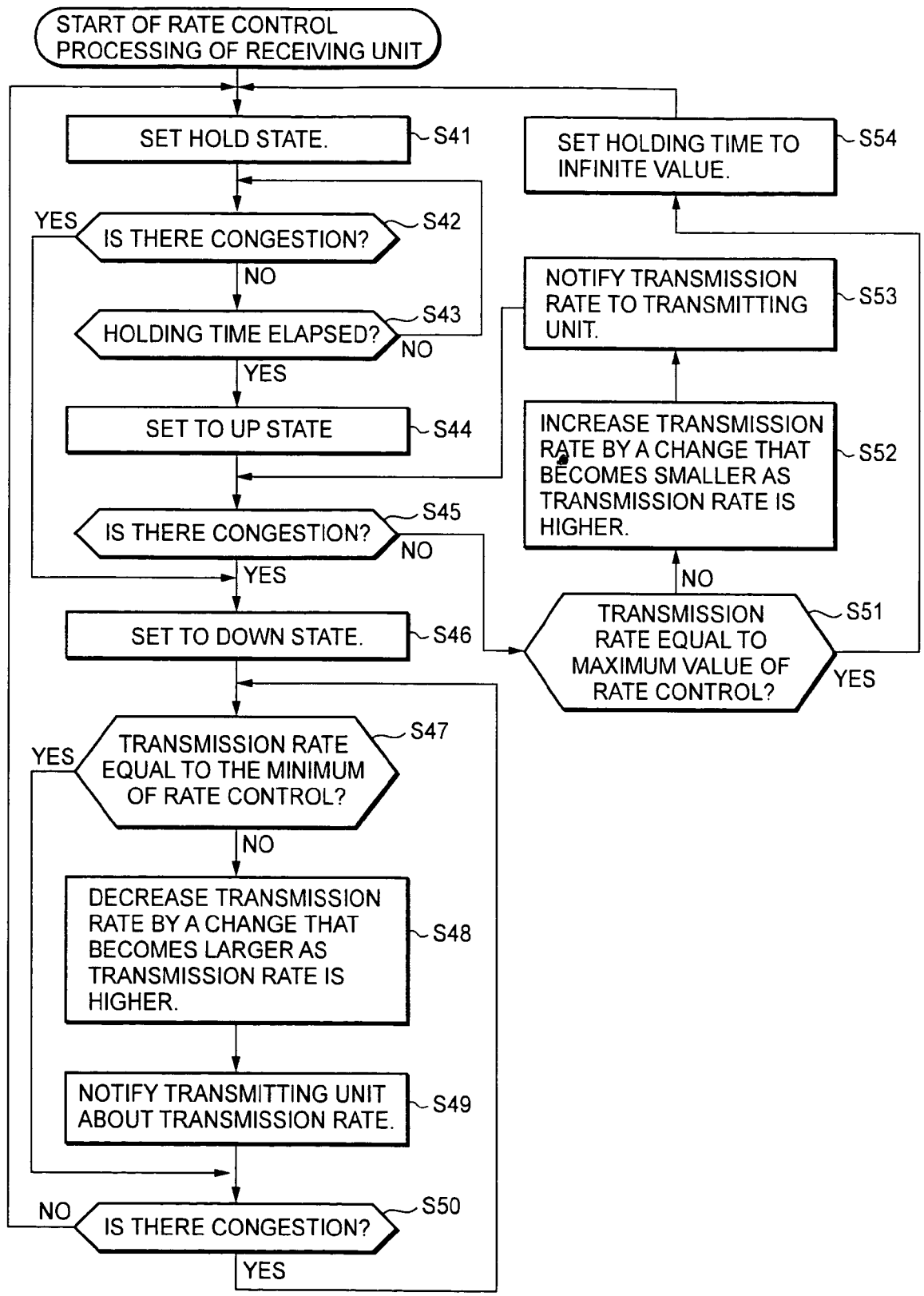
FIG. 5 is a flowchart showing rate control processing executed by a receiving unit.

FIG. 5 shows a flowchart of the rate control processing of the receiving side under control of the three modes (states) described above. The rate control of the receiving side will be described with reference to the flowchart in FIG. 5.

In step S41, the mode setting unit 44 of the information processing apparatus 1-2 in the receiving side sets the state to the holding state. As described above, the data transmission rate is not changed in the hold state. The mode setting unit 44 acquires the current time of day from the timer 47.

In step S42, the congestion checking unit 43 checks if a congestion occurs on the network. If it is found that there is no congestion in step S42, then the mode setting unit 44 checks if the holding time elapses in step S43. More specifically, the mode setting unit 44 acquires the current time of day from the timer 47, and checks if the difference between the acquired current time of day current and the time of day when the hold state is set in step S41 is longer than the pre-set holding time (checks if the holding time elapses). If it is found that holding time does not elapse in step S43, the control is passed back to step S42 to repeat the processing steps that follow.

If it is found that the holding time elapses in step S43, the mode setting unit 44 sets the state to the up state in step S44. As described above, the transmission rate is increased in the up state. In step S45, the congestion checking unit 43 checks if there is a congestion on the network.

If it is found that there is a congestion in step S45 or in step S42, the mode setting unit 44 sets the state to the down state in step S46. As described above, the transmission rate is decreased in the down state.

In step S47, the transmission rate checking unit 45 checks if the transmission rate is equal to a pre-set minimum value. If it is found that the transmission rate is not equal to the minimum value (that is, higher than the minimum value), the transmission rate setting unit 46 decreases the transmission rate by a change that becomes larger as the transmission rate is higher in step S48.

Figure 6:
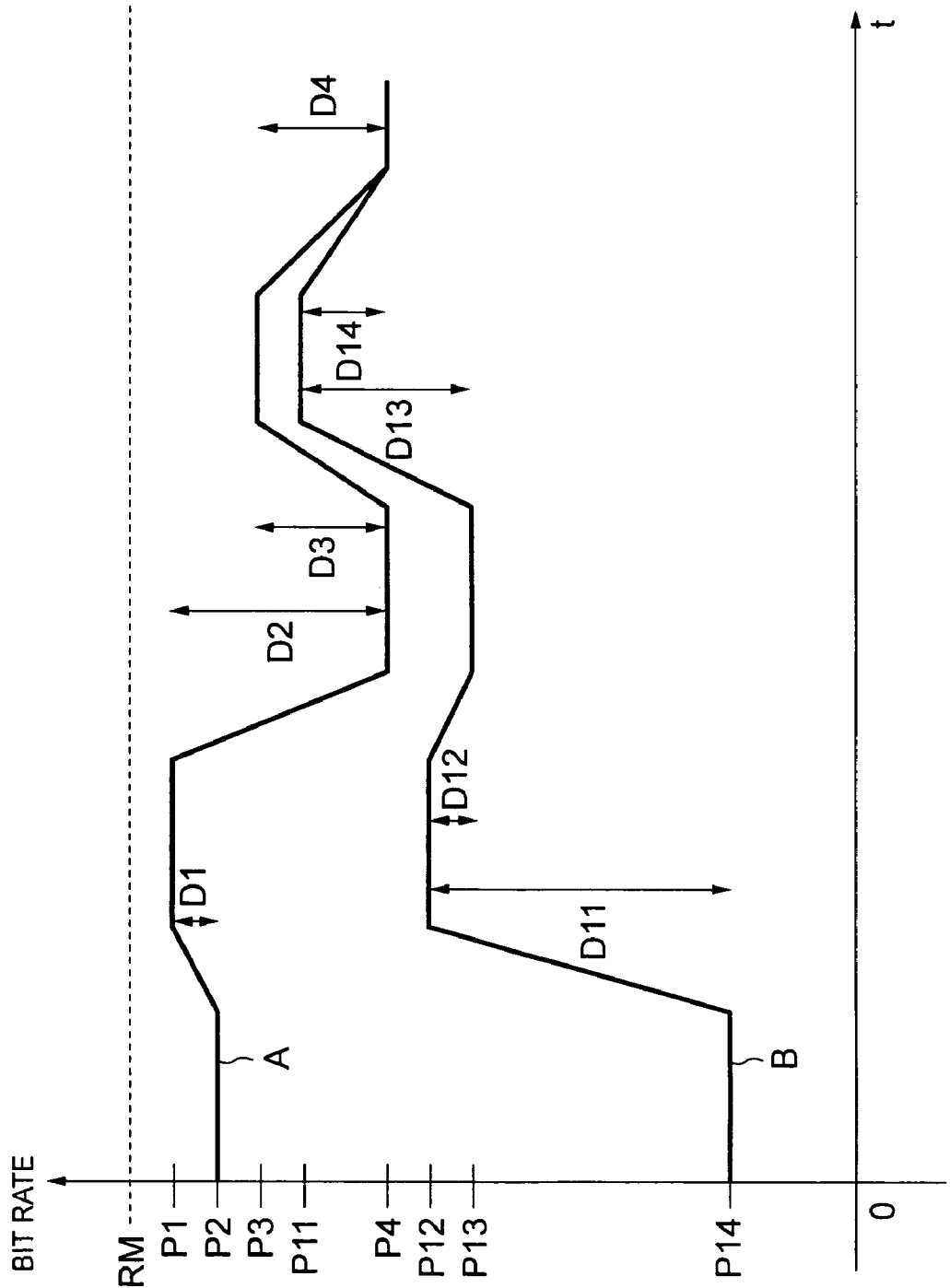
FIG. 6 is a diagram showing an example of a change in rates.

With reference to FIG. 6, the following describes an example of decreasing the transmission rate. In FIG. 6, a horizontal axis represents a time t and a vertical axis represents a bit rate (transmission rate). Further, an RM represents a maximum bit rate. How to find the maximum bit rate will be described later with reference to a flowchart in FIG. 8. In the example in FIG. 6, a stream A is received by the data receiving unit 41.

The stream A repeats the hold state and the up state until reaches a peak point P1. When the transmission rate of the stream A reaches the peak point P1, the state is changed to the down state (processing in step S46). Because the bit rate of the stream A at the peak point P1 is close to the maximum bit rate RM, the transmission rate setting unit 46 decreases the bit rate of the stream A by a variation width D2.

On the other hand, when the data receiving unit 41 receives a stream B wherein a transmission rate is low as shown in FIG. 6, the bit rate is decreased from a peak point P12 by a smaller variation width D12 because the value at the peak point 12 is sufficiently lower than the maximum bit rate RM.

More specifically, the bit rate variation width D2 of the stream A at the peak point P1 and the bit rate variation width D12 of the stream B at the peak point P12 are set such as D2>D12. For example, for the stream A wherein the transmission rate is close to the maximum bit rate RM, the transmission rate is decreased to 70% of the transmission rate at the peak point P1 (decreased by 30%), and for the stream B, the transmission rate is decreased to 85% of the transmission rate at the peak point P12.

Therefore, as shown in FIG. 6, a variation width D4 of the stream A at a peak point P3, which is lower than the peak point P1, is smaller than the variation width D2 (D2>D4). Similarly, for the stream B, a variation width D14 at peak point P11, which is higher than peak point P12, is larger than the variation width D12. In this way, when the percentage of the reception bit rate of a stream to the maximum bit rate is higher, the bit rate is to be decreased by a higher percentage.

Returning to FIG. 5, the data transmitting unit 49 notifies the transmission rate decreased (set) by the processing in step S48 to the transmitting unit via the Internet 3 in step S49. Because the information processing apparatus 1-1 is set to be the transmitting side in this example, the information processing apparatus 1-1 receives and sets the transmission rate through the processing shown in FIG. 3 described above.

If it is found that the transmission rate is equal to the minimum value of rate control in step S47, or after step S49 is executed, the control is passed to step S50, and the congestion checking unit 43 checks if there is a network congestion. If it is found that there is a congestion in step S50, the control is passed back to step S47 to repeat the steps that follow. That is, if it is found again that the transmission rate is not equal to the minimum value of rate control in step S47, the control is passed to step S48 to further decrease the transmission rate.

If it is found in step S50 that there is no congestion, the control is passed back to step S41 to repeat the steps that follow. That is, the state is set to the hold state again (step S41) and, based on the presence of the congestion and on the holding time, is set to the up state (step S44).

If it is found that there is no congestion in the up state in step S45, the transmission rate checking unit 45 checks whether the current transmission rate is equal to the maximum value in step S51. If it is found that the transmission rate is not equal to the maximum value of the rate control, the transmission rate setting unit 46 increases the transmission rate, in step S52, by a variation width that becomes smaller as the transmission rate is higher.

More specifically, the variation width D1 is smaller than the variation width D11 in the example in FIG. 6. The variation width D1 is a variation width in the bit rate of the stream A, wherein the bit rate is close to the maximum value RM, that is produced when the bit rate is increased from a peak point P2 to the peak point P1, and the variation width D11 is a variation width in the bit rate of the stream B, wherein the bit rate is sufficiently lower than the maximum value RM, that is produced when the bit rate is increased from a peak point P14 to a peak point P12.

Similarly, the variation width D3 of the stream A from a peak point P4 to a peak point P3 is smaller than the variation width D13 of the stream B from a peak point P13 to a peak point P11.

In step S53, the data transmitting unit 49 notifies the transmitting side about the transmission rate increased (set) by the transmission rate setting unit 46, via the Internet 3. In response to this notification, the information processing apparatus 1-1 of the transmitting side receives and sets the transmission rate as shown in FIG. 3 described above. After the processing in step S53, the control is passed to step S45 to repeat the same processing steps.

If it is found that the transmission rate is equal to the maximum value in step S51, the congestion checking unit 43 sets the holding time to an infinite value in step S54. After that, the control is passed back to step S41 to repeat the steps that follow. This sequence of processing keeps the transmission rate from exceeding the maximum value.

The processing shown in FIG. 5 enables the receiving side to dynamically control the transmission rate according to the network status. In this way, the repeated processing of steps in FIG. 5 allows the transmission rate of the stream A and the transmission rate of the stream B to come closer (match) each other.

Figure 7:
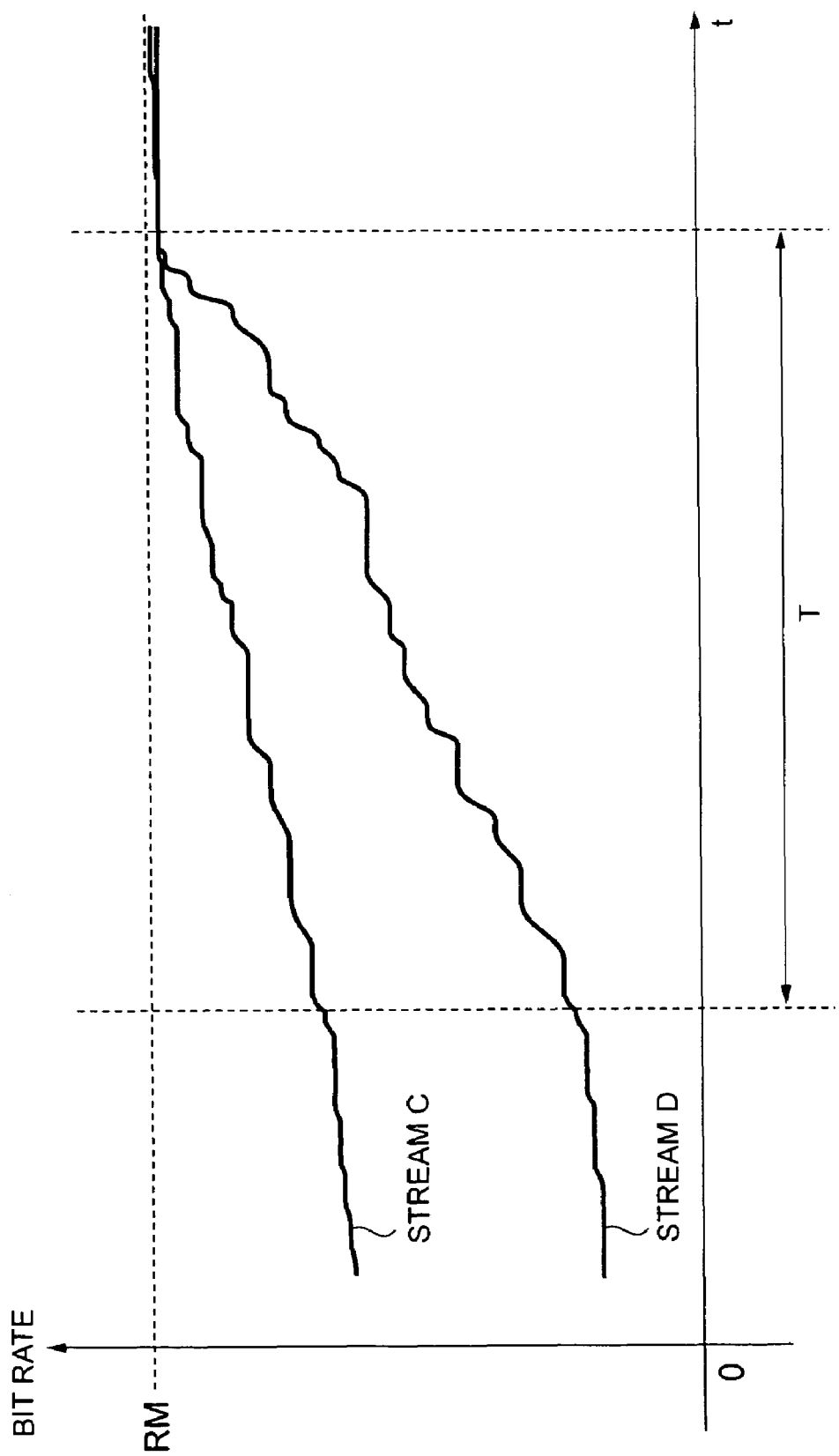
FIG. 7 is a diagram showing another example of a change in rates.

The processing for increasing the transmission rate in step S52 may also be executed as shown in FIG. 7. In the example shown in FIG. 7, the transmission rate setting unit 46 increases the transmission rate of both the stream C having a higher transmission rate and the stream D having a lower transmission rate, so that the time T required to reach the maximum bit rate RM becomes constant (fixed). This makes it possible to set the transmission rate of the stream C and the stream D to the maximum bit rate RM when the time T elapses while the hold state (step S41) and the up state (step S44) are repeated.

In addition, contents of reliable quality can be provided by not setting the transmission rate to a value higher than the predetermined maximum value RM even when the transmission line has a sufficient transmission capacity.

As described above, the maximum value and the minimum value are set for the transmission rate in this system. With reference to the flowcharts in FIGS. 8 to 12, the following describes how the maximum value and the minimum value are determined. This processing is executed by the information processing apparatus 1-2 of the receiving side (immediately before the content data is received).

In step S71, the speed measurement unit 48 measures the downstream transmission rate. The downstream transmission rate is obtained, for example, by executing the processing shown in the flowchart in FIG. 9.

In step S101, the data transmitting unit 49 accesses the measurement server 4, and requests to transmit a measurement packet. In response to this request, the measurement server 4 transmits a measurement packet 21. This measurement packet 21 is transmitted via the backbone link 5, the Internet 3, and the access link 2-2.

In step S102, the data receiving unit 41 receives the measurement packet 21 transmitted from the measurement server 4. The predetermined data included in this packet is used for measuring the transmission rate, so that it may be any data having fixed amount.

In step S103, the speed measurement unit 48 measures the time Td, from the time when the data receiving unit 41 receives the first data to the time when it receives the Kth byte data (K: data of a size appropriate for access link speed), based on the time of day clocked by the timer 47.

In step S104, the speed measurement unit 48 calculates K/Td and determines the resultant value as the downstream transmission rate Vd (that is, Vd=K/Td is calculated).

To execute the measurement function, the measurement server 4 is connected to the backbone link 5 that has a sufficiently wide band (at least wider than the band of the access links 2-1 and 2-2). Therefore, the transmission rate Vd is the speed of the access link 2-2 that is the bottleneck of the speed of the transmission line composed of the backbone link 5 and the access link 2-2. In this way, the downstream transmission rate Vd of the information processing apparatus 1-2 is determined by executing the processing in FIG. 9.

On the other hand, the information processing apparatus 1-1 of the transmitting side measures the upstream transmission rate in advance. With reference to the flowchart in FIG. 10, the following describes how the upstream transmission rate is measured.

In step S121, the data transmitting unit 49 of the information processing apparatus 1-1 accesses the measurement server 4 via the access link 2-1 and the Internet 3 to make a measurement request and transmits the measurement packet 11. This packet is used for measuring the transmission rate, so that it may be any packet having known data amount.

In step S122, the speed measurement unit 48 measures the time Tu, from the time when the data transmitting unit 49 transmits the first data to the time when the data transmitting unit 49 transmits the Lth byte data (L: data of a size appropriate for access link speed), based on the time of day clocked by the timer 47.

In step S123, the speed measurement unit 48 calculates L/Tu and determines the resulting value as the upstream transmission rate Vu of the information processing apparatus 1-1 (that is, Vu=L/Tu is calculated).

In step S124, the data transmitting unit 49 transmits the transmission rate Vu calculated by the speed measurement unit 48 in response to the request from the receiving side (the information processing apparatus 1-2).

Because the backbone link 5 has a band sufficiently wider than that of the access link 2-1, the transmission rate Vu is the speed of the access link 2-1 that is the bottleneck of the speed of the transmission line composed of the access link 2-1 and the backbone link 5. The upstream transmission rate Vu is calculated by executing the processing in FIG. 10 and is sent in response to a request from the receiving side.

Returning to FIG. 8, the maximum route rate determination unit 51 of the information processing apparatus 1-2 of the receiving side determines the maximum route rate in step S72. The maximum route rate is determined, for example, by executing the processing shown in FIG. 11.

In step S141, the data transmitting unit 49 requests the transmitting unit to notify the upstream transmission rate. In this example, the data transmitting unit 49 requests the information processing apparatus 1-1 to notify the upstream transmission rate. The information processing apparatus 1-1, which already calculates the upstream transmission rate Vu by executing step S123 in FIG. 10 described above, transmits the upstream transmission rate Vu (processing in step S124) in response to this request (request issued in step S141) from the information processing apparatus 1-2.

In step S142, the data receiving unit 41 of the information processing apparatus 1-2 receives the notification of the upstream transmission rate Vu sent from the information processing apparatus 1-1 (transmitting unit). The upstream transmission rate Vu is outputted to the maximum route rate determination unit 51.

Figure 9:
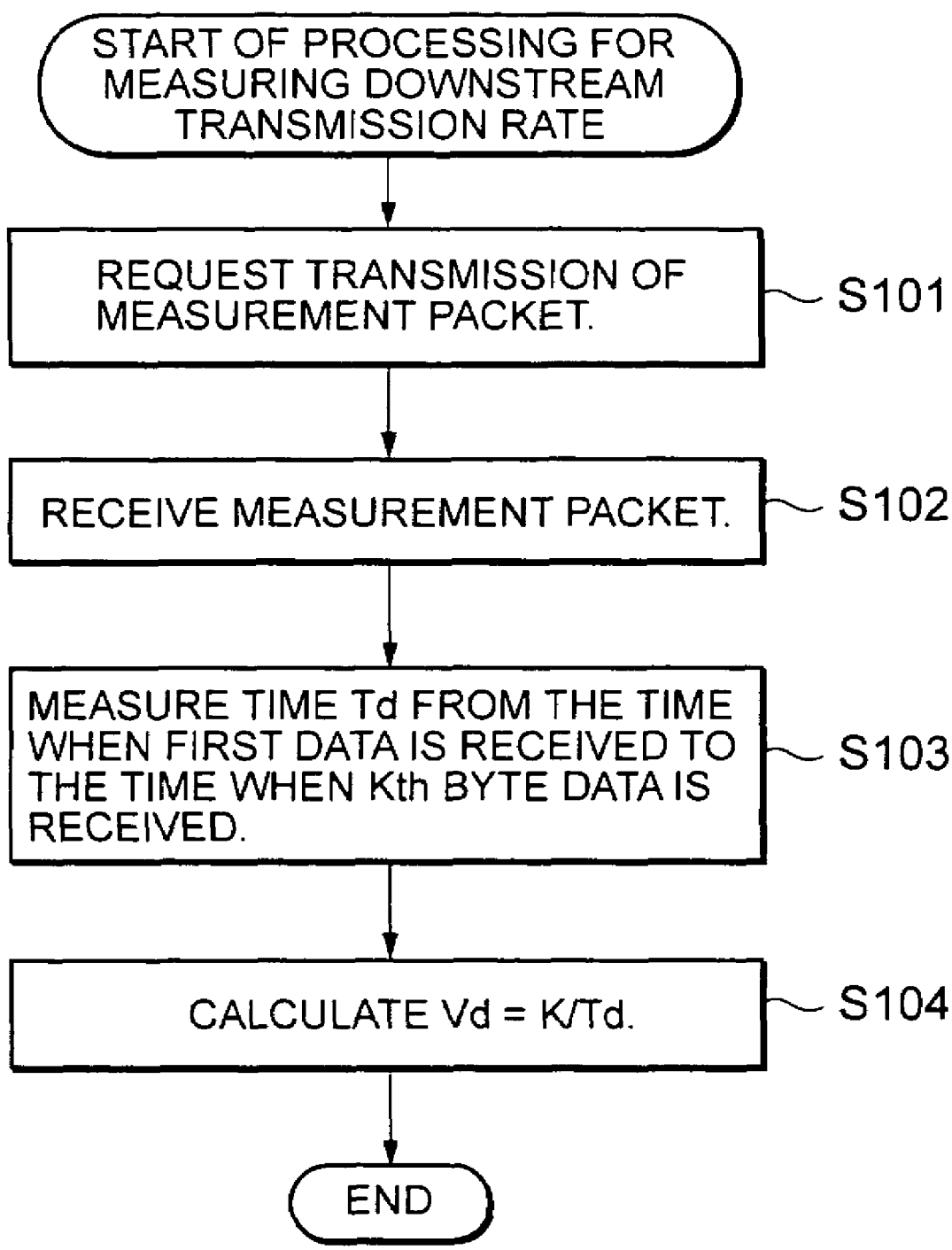
FIG. 9 is a flowchart showing processing for measuring a downstream transmission rate.
Figure 10:
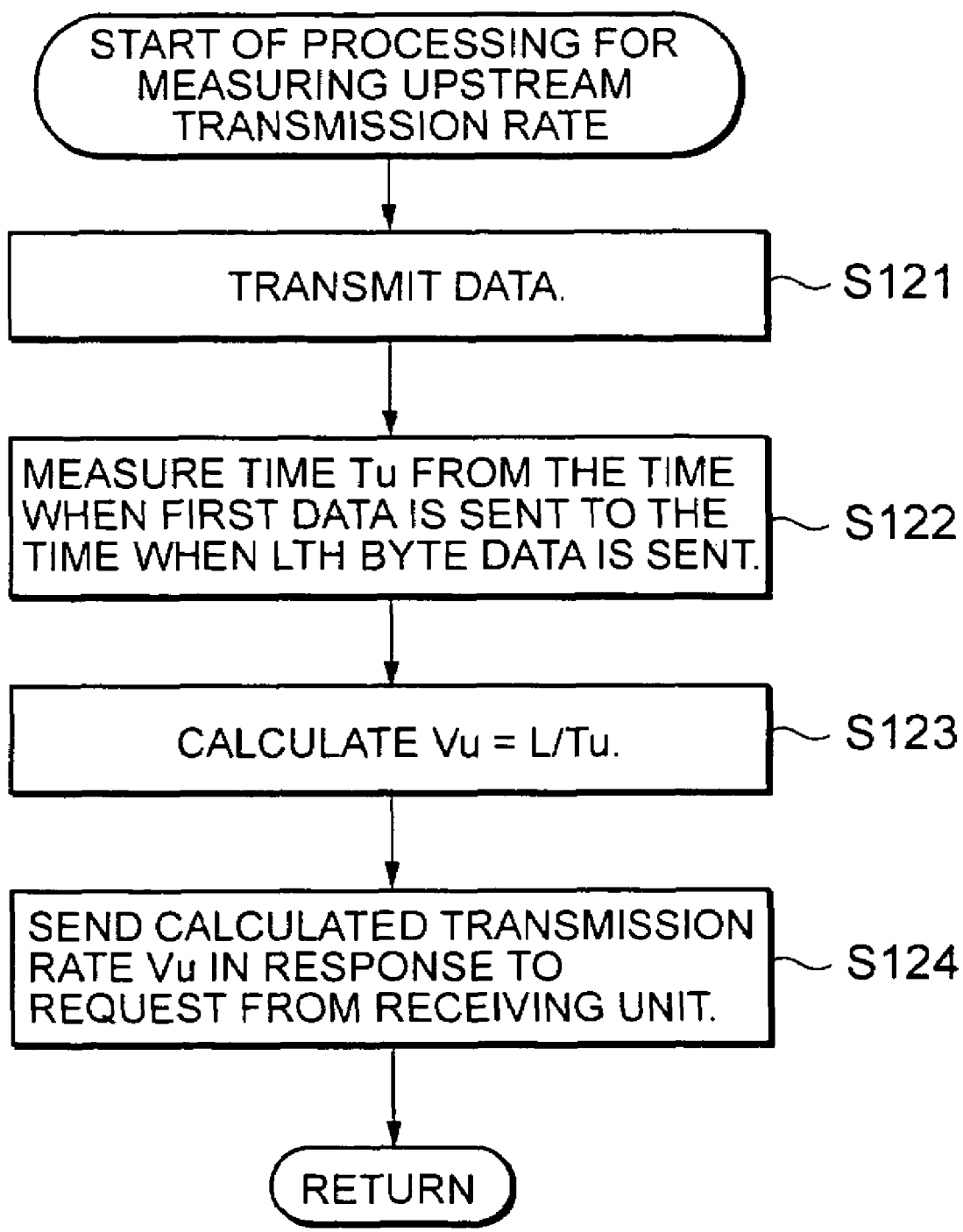
FIG. 10 is a flowchart showing processing for measuring an upstream transmission rate.

In step S143, the maximum route rate determination unit 51 selects the downstream transmission rate Vd of itself (the downstream transmission rate Vd of the information processing apparatus 1-2 calculated by executing the processing in FIG. 9) or the upstream transmission rate Vu of the opponent side (the information processing apparatus 1-1), whichever is lower, as the maximum route rate. For example, when the downstream transmission rate Vd is 1200 Kbps and the upstream transmission rate Vu is 500 Kbps, the lower rate is the upstream transmission rate Vu. The maximum route rate determination unit 51 multiplies this upstream transmission rate Vu, for example, by 0.8 (a predetermined coefficient smaller than 1) to get the maximum route rate. This is done to make the maximum route rate a little bit lower than the actual rate to prevent a network congestion. In this case, the transmission rate of 400 Kbps (=500 Kbps×0.8) is the maximum route rate. In this way, the maximum route rate is determined by executing the processing in FIG. 11.

Returning to FIG. 8, the maximum bit rate setting unit 52 acquires the maximum bit rate of the stream, that is, a transmission rate determined by the processing capability, in step S73. The maximum bit rate of the stream is acquired, for example, by executing the processing in the flowchart in FIG. 12.

In step S161, the data transmitting unit 49 requests the transmitting side to notify the maximum bit rate of a transmitting stream. In this example, the data transmitting unit 49 requests the information processing apparatus 1-1 of the transmitting side to notify the maximum bit rate of the transmitting stream. The maximum bit rate of the transmitting stream depends, for example, on the processing capability (transmitting capability) of the data transmitting unit 49 of the transmitting side (in this example, the information processing apparatus 1-1) from which the stream is sent. In response to this request (processing in step S161), the information processing apparatus 1-1 transmits the maximum bit rate of the transmitting stream corresponding to its own capability.

In step S162, the data receiving unit 41 of the information processing apparatus 1-2 receives the notification of the maximum bit rate of the transmitting stream from the transmitting side (in this example, the information processing apparatus 1-1).

In step S163, the maximum bit rate setting unit 52 of the information processing apparatus 1-2 selects the maximum bit rate of the stream receivable by the data receiving unit 41 or the maximum bit rate of the transmitting stream from the transmitting side (in this example, the information processing apparatus 1-1), which ever is lower, as the maximum bit rate of the downstream stream. That is, the maximum bit rate of the receiving stream depends on the capability of the data receiving unit 41 of the side that receives the stream (in this example, the information processing apparatus 1-2). The maximum bit rate setting unit 52 selects the maximum bit rate of the data receiving unit 41 or the maximum bit rate of the transmitting stream from the information processing apparatus 1-1 of the transmitting side, whichever is lower, as the maximum bit rate of the downstream stream. In this way, the maximum bit rate of the stream (the transmission rate depending on the processing capability of transmitting/receiving units) is acquired.

Figure 12:
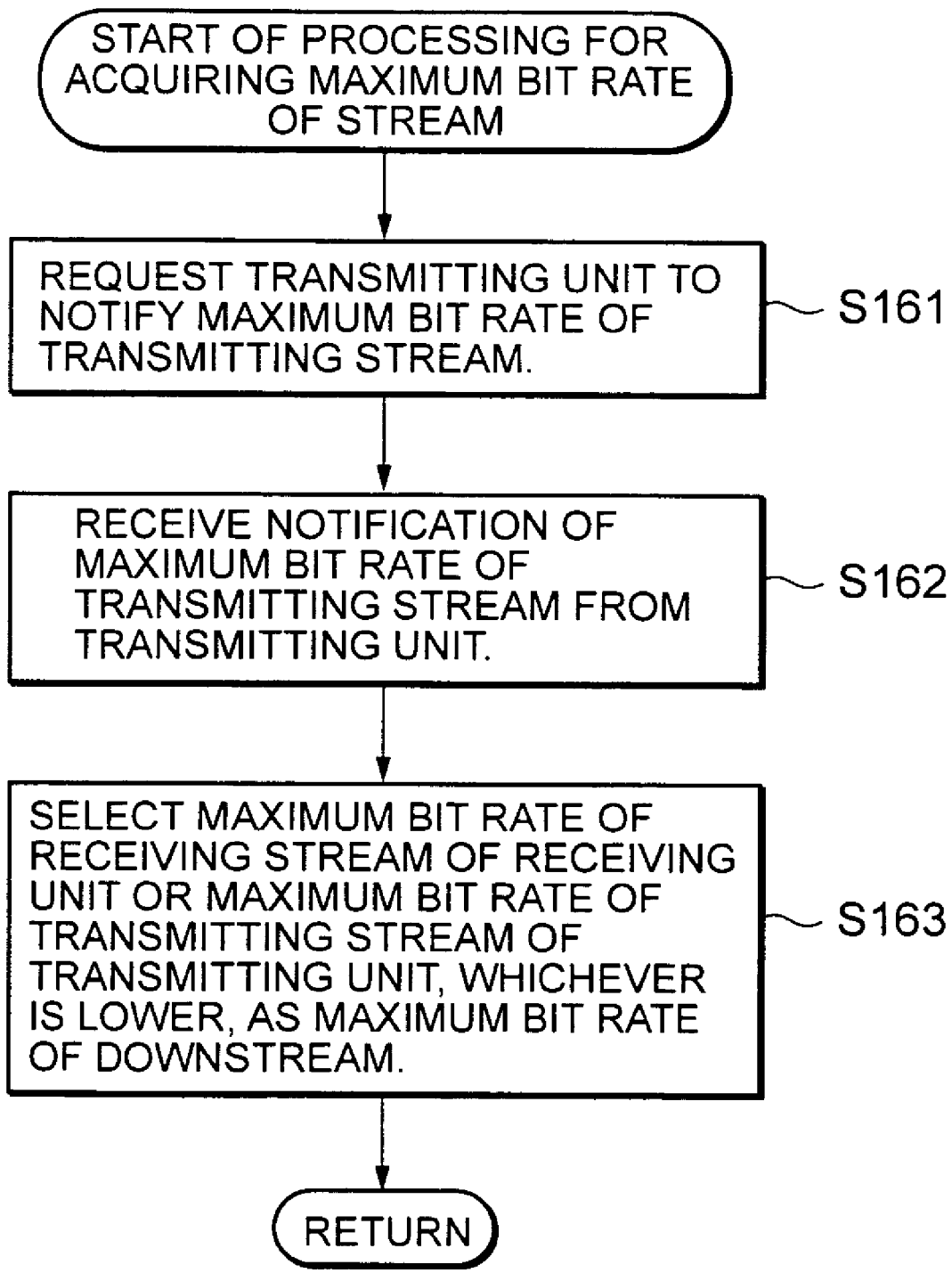
FIG. 12 is a flowchart showing processing for acquiring the maximum bit rate of a stream.

Returning to FIG. 8, the maximum value/minimum value determination unit 53 compares, in step S74, the maximum route rate (maximum route rate determined by the processing in FIG. 11) determined by the maximum route rate determination unit 51 with the maximum bit rate of the stream (maximum bit rate of the stream determined by the processing in FIG. 12) acquired by the maximum bit rate setting unit 52 to check if the maximum route rate is lower than the maximum bit rate (checks if the maximum route rate<the maximum bit rate).

If it is found that the maximum route rate is lower than the maximum bit rate in step S74, the maximum value/minimum value determination unit 53 sets the maximum route rate to the maximum bit rate RM in step S75. Conversely, if it is found that the maximum route rate is not lower than the maximum bit rate (that is, the maximum route rate is higher than the maximum bit rate) in step S74, the maximum value/minimum value determination unit 53 sets the maximum bit rate of the stream to the maximum bit rate RM in step S76.

After step S75 or step S76 (that is, after the maximum bit rate is set), the maximum value/minimum value determination unit 53 determines the minimum bit rate RL based on the maximum bit rate RM in step S77. Although dependent on the stream, the minimum bit rate RL is, for example, ⅕ of the maximum value (the maximum bit rate RM). That is, RL=RM×⅕ is calculated. This multiplier need not be ⅕, but some other multiplier may also be used. By executing the processing in FIGS. 8 to 12, the maximum bit rate RM and the minimum bit rate RL are determined. Those values are used in steps S47 and S51 in FIG. 5 described above.

Figure 13:
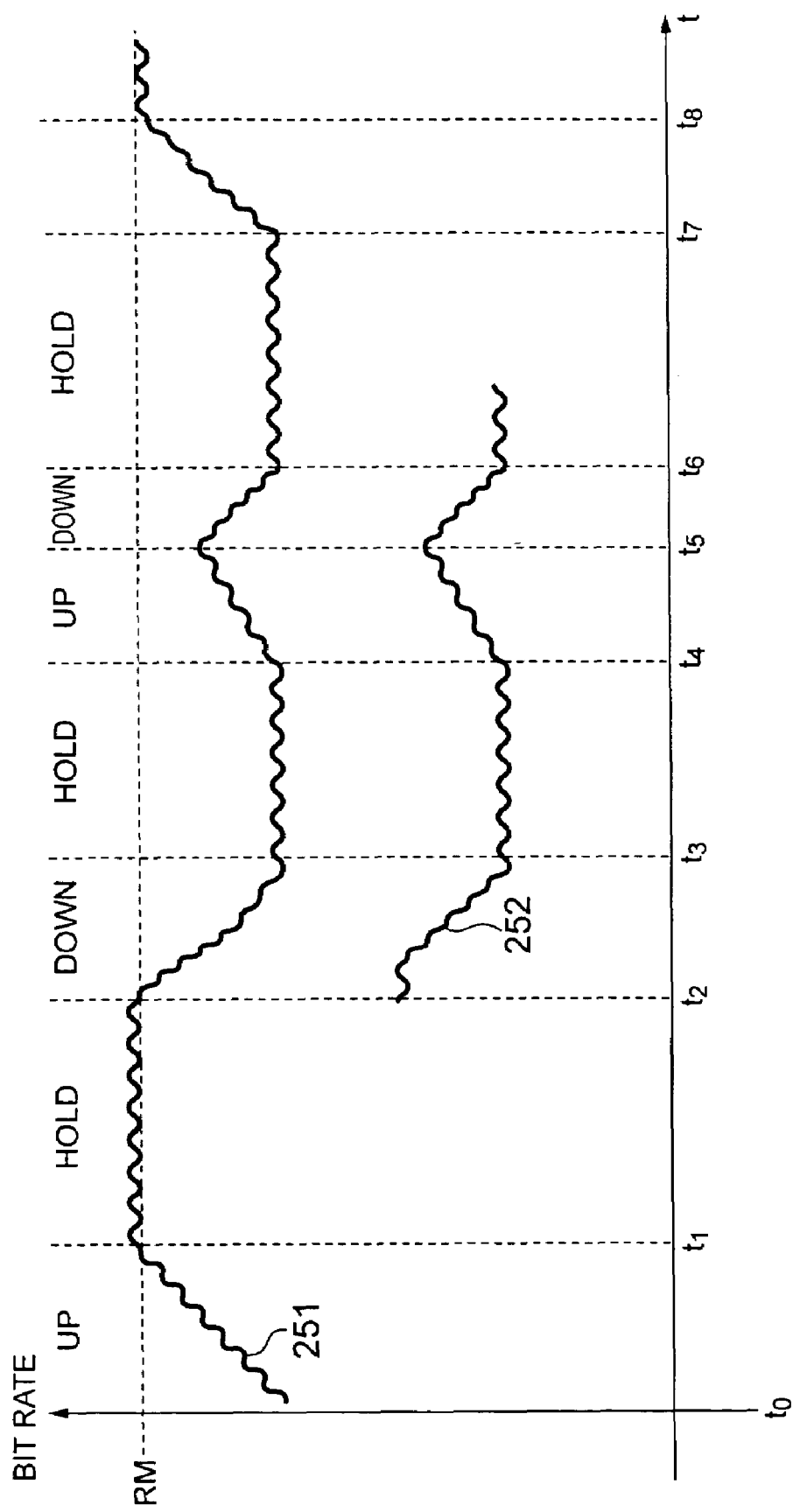
FIG. 13 is a diagram showing a still another example of a change in rates.

By executing the processing described above, the stream is transmitted at the transmission rate that is the bit rate shown in FIG. 13. In the example in FIG. 13, the transmission rate is put in the up state at a time t0 and the bit rate of a stream 251 is increased to the maximum bit rate RM (for example, step S52 in FIG. 5). At a time t1, the state is changed to the hold state and the bit rate of the stream 251 is kept constant (for example, it is found in step S51 in FIG. 5 that the transmission rate reaches the maximum value). At a time t2, the transmission of a stream 252, a stream other than the stream 251, is started, and both transmission rates are put in the down state to decrease the bit rates of both the stream 251 and the stream 252. This is because the transmission of the stream 252 is started and a congestion is detected (for example, it is found in step S42 in FIG. 5 that there is a congestion).

At a time t3, the state is changed to the hold state, and the bit rates of the stream 251 and the stream 252 are kept constant (for example, step S41 in FIG. 5). At a time t4, the state is changed to the up state, and the bit rates of the stream 251 and the stream 252 are increased. At a time t5, the state is changed to the down state, and the bit rates of the stream 251 and the stream 252 are decreased. At a time t6, the state is changed to the hold state, and the bit rates of the stream 251 and the 252 are kept constant.

After that, the transmission of the stream 252 is terminated and, after the holding time elapses (the holding time elapses after the termination of the stream 252. For example, YES in step S43 in FIG. 5), the state is changed to the up state at a time t7 (for example, step S44 in FIG. 5). After that, because the transmission rate reaches the maximum value (RM) of the rate control, the state is changed to the hold state at a time t8. In this way, the transmission rate of the stream is dynamically controlled within a range between the maximum value and the minimum value.

Figure 14:
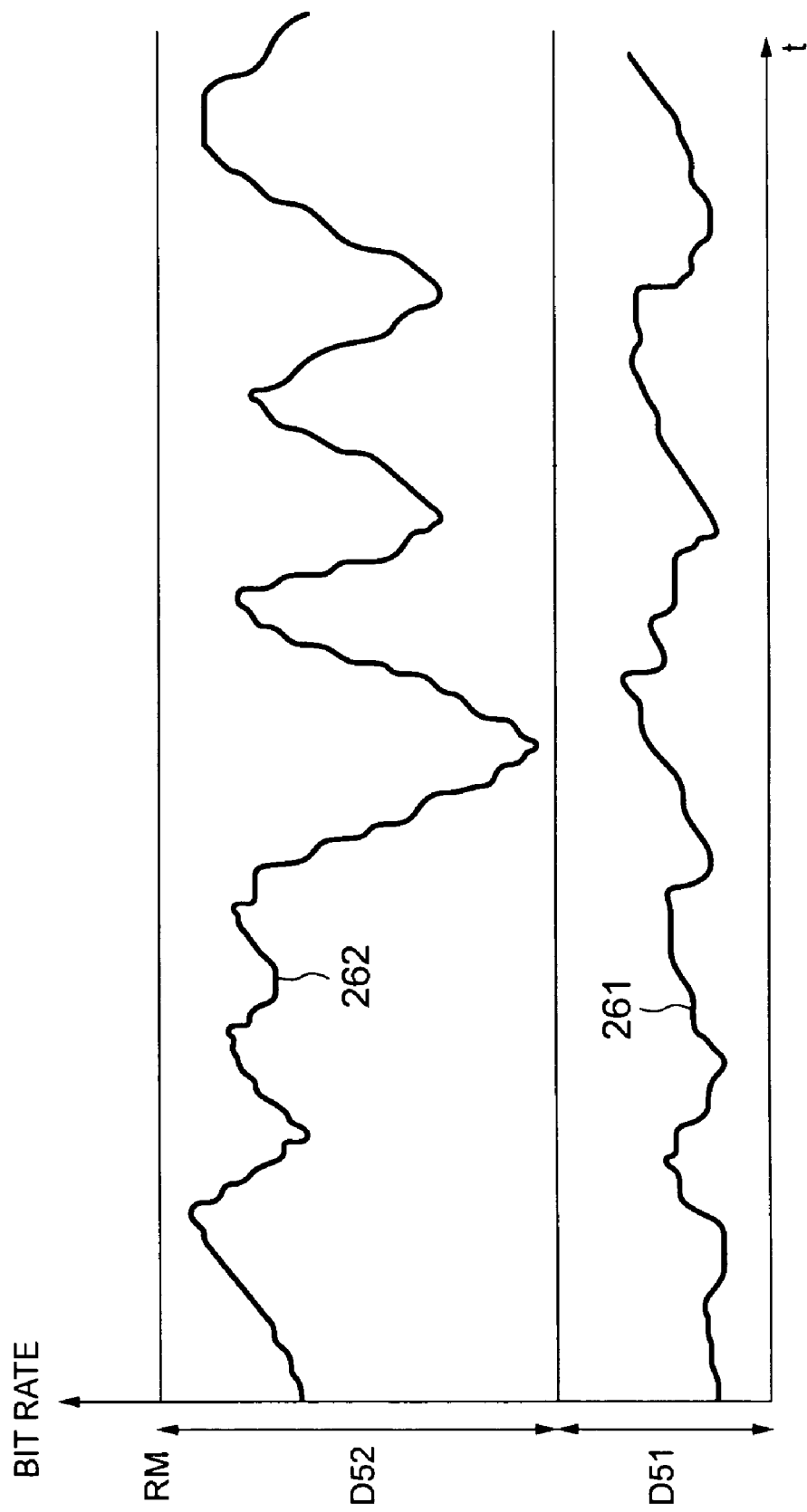
FIG. 14 is a diagram showing bands allocated to streams.

This control method correctly allocates bands to an apparatus requiring a wide band and to an apparatus capable of operating in a narrow band as shown in FIG. 14. In the example in FIG. 14, the maximum value of the rate control of a stream 261 is lower than the maximum value of the rate control of a stream 262. That is, the stream 261 is capable of operating in a narrow band while the stream 262 requires a wide band.

In the example in FIG. 6, the maximum bit rate RM of the stream A equals the maximum bit rate of the stream B. This indicates that the maximum bit rate RM obtained through the processing in FIGS. 8 to 12 is equal between the stream A and the stream B. However, there is of course a case in which the maximum bit rate RM differs between the stream A and the stream B (for example, the example in FIG. 14). In such a case, the band is allocated based on the maximum bit rate RM of each stream as shown in FIG. 14.

This allocation method gives the stream 262 a band D52 that is wider than a band D51 of the stream 261, making the image quality equal between the stream 262 requiring a wide band and the stream 261 capable of operating in a narrow band. That is, this method prevents the image quality of the stream 262, which requires a wide band, from significantly deteriorating.

Figure 15:
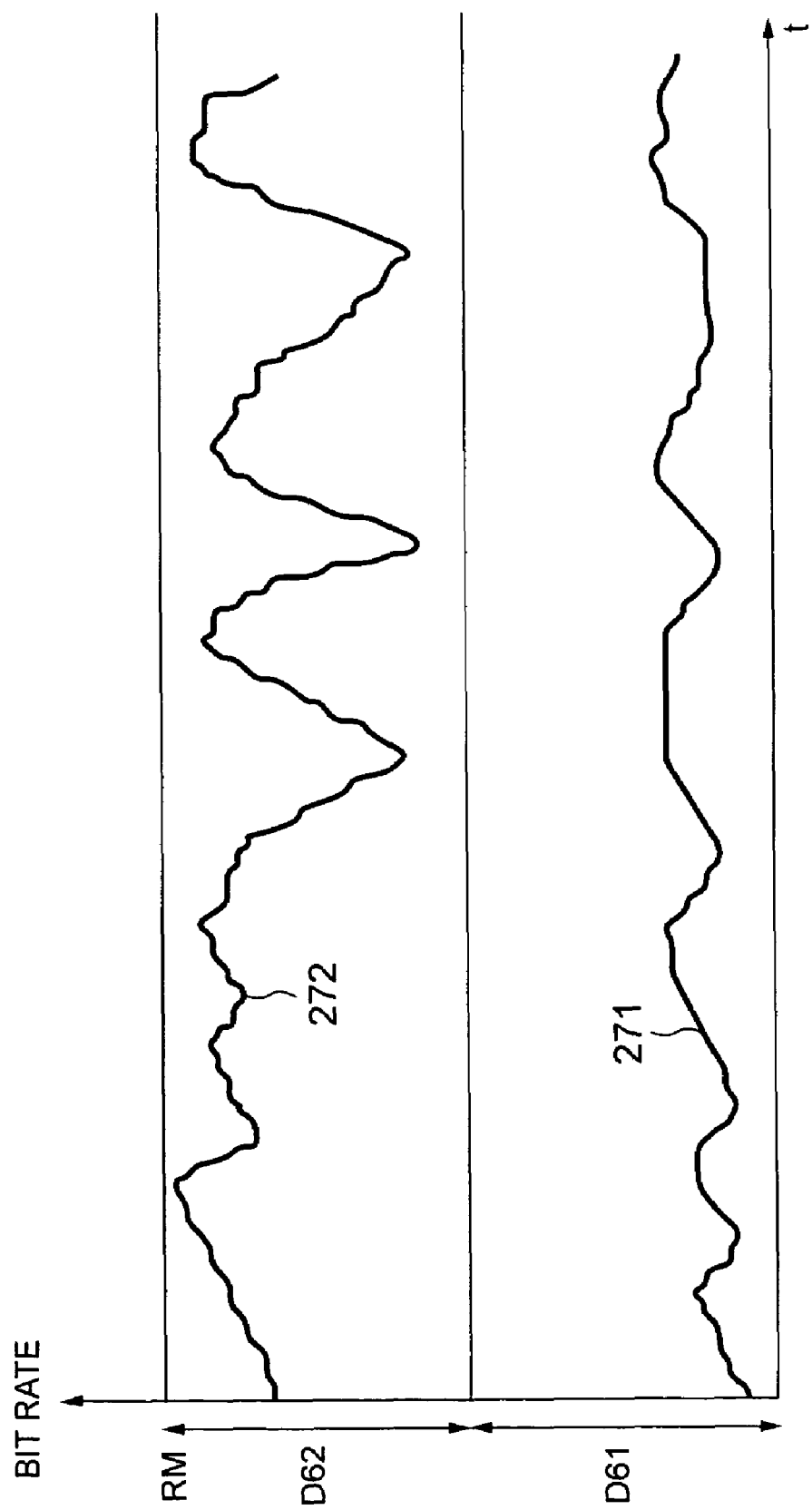
FIG. 15 is a diagram showing bands allocated to streams.

By contrast, if a band of equal width is allocated to an apparatus requiring a wide band and to an apparatus capable of operating in a narrow band as shown in FIG. 15, a stream 271 occupies a wider band than is required (although a wider band does not improve the image quality) while the image quality of a stream 272, which requires a wide band, improves significantly. This embodiment prevents the image quality of the stream, which requires such a wide band, from deteriorating significantly. In step S42, step S45, or step S50 in FIG. 5, any method may be used to detect a congestion.

In general, a network congestion is detected by detecting a packet loss or using RTT (Round Trip Time) between the transmitting side and the receiving side. In this example, the data receiving unit continuously transmits the packet number (RTP sequence number) to the congestion checking unit 43 to allow the congestion checking unit to detect a packet loss. When packet losses more than the threshold occur in a given period of time, the congestion checking unit 43 outputs the congestion detection signal to the mode setting unit 44. The congestion detection processing in step S42, step S45, and step S50 in FIG. 5 is performed based on this congestion detection signal.

As described above, the information processing apparatus 1-1 of the transmitting side can transmit data to the information processing apparatus 1-2 of the receiving side at a transmission rate based on the received transmission rate.

When the information processing apparatus 1-2 is the transmitting side and the information processing apparatus 1-1 is the receiving side, the same processing may be performed simply by interchanging their positions.

The maximum bit rate established for use in the dynamic rate control prevents the transmission rate from being changed when the maximum bit rate is reached (the state is changed from the up state to the hold state). This ensures a stabilized transmission rate and prevents a packet loss from occurring or a network delay from being increased even when there is a vacant band higher than the maximum bit rate.

The minimum bit rate established for use in the dynamic rate control keeps the transmission rate higher than the minimum bit rate, thus preventing the transmission rate from decreasing significantly.

By decreasing the transmission rate based on the proportion of the reception bit rate to the maximum bit rate almost equalizes the transmission rates of streams having an equal maximum bit rate and, at the same time, allocates bands to streams having unequal maximum bit rates so that the image quality deteriorates evenly.

In addition, by establishing a given length of time for different streams to reach the maximum bit rate (as shown in FIG. 7), the streams having an equal maximum bit rate can be stabilized in the same band more rapidly.

An apparatus of the data transmitting side and an apparatus of the data receiving side can transmit and receive information at a transmission rate established according to the network status. In addition, the apparatus of the data receiving side can set a transmission rate according to the network status (congestion, maximum value and minimum value of the rate control, holding time, etc.).

The information processing apparatus 1, though capable of both transmitting and receiving information in the above description, may be configured so that it can only transmit or receive data. In addition, although the receiving side controls the transmission rate in the above description, the transmitting side may control the transmission rate. In this case, the transmitting side determines the rate and transmits data at the determined rate.

Although the upstream and downstream transmission rates are measured between the information processing apparatus 1 and the measurement server 4 in the above description (FIG. 9 and FIG. 10), the rates may be measured directly between the information processing apparatus 1-1 of the transmitting side and the information processing apparatus 1-2 of the receiving side without using the measurement server 4.

As the network, not only the Internet but also a WAN (Wide Area Network), a LAN (Local Area Network), or any other type of network may be used.

Sequences of processing described above may also be executed by software. In this case, the information processing apparatus 1 is configured as shown in FIG. 16. A CPU (Central Processing Unit) 341 of the information processing apparatus 1 executes various types of processing described above according to a program stored in a ROM (Read Only Memory) 342 or a program loaded from an HDD (Hard Disc Drive) 348 to a RAM (Random Access Memory) 343. The RAM 343 also stores data necessary for the CPU 341 to execute the various types of processing.

The CPU 341, ROM 342, and RAM 343 are interconnected via an internal bus 344. An input/output interface 345 is also connected to the internal bus 344. Connected to the input/output interface 345 are an input unit 346 composed of a keyboard, a mouse, etc., an output unit 347 composed of a display unit such as a CRT (Cathode Ray Tube) or an LCD (Liquid Crystal Display) and a speaker, etc., the HDD 348 composed of a hard disk, and a network interface 349 composed of a MODEM, a terminal adapter, etc. The network interface 349 performs communication processing via a network such as the Internet 3.

A drive 351 is also connected to the input/output interface 345, as required, to mount a magnetic disk 401, an optical disk 402, a magneto-optical disk 403, or a semiconductor memory 404. A computer program read from the drive is installed on the HDD 348 as necessary.

A recording medium used for distributing the program is a package medium provided separately from the main body as shown in FIG. 16. This package medium, on which the program is recorded is, for example, the magnetic disk 401 (including a flexible disk), optical disk 402 (including a CD-ROM (Compact Disk-Read Only Memory), DVD (Digital Versatile Disk)), magneto-optical disk 403 (including MD (Mini-Disk) (trademark)), or semiconductor memory 404.

In this specification, the steps describing the program recorded on the recording medium includes not only processing executed in the described order in a time series manner but also processing executed not always in a time series manner but concurrently or individually. In this specification, the system refers to a whole device comprising a plurality of units.

What is claimed is:

1. A data communication system comprising a first information processing apparatus for transmitting data over a network and a second information processing apparatus for receiving the data from said first information processing apparatus over said network, wherein:
    said first information processing apparatus measures an upstream transmission rate of an access link;
    said second information processing apparatus measures a downstream transmission rate of an access link; and
    one of said first information processing apparatus and said second information processing apparatus, which dynamically controls a transmission rate, receives the transmission rate measured by a measurement apparatus, determines a maximum value of the transmission rate based on the smaller of the two transmission rates, and determines the transmission rate within a range of the maximum value, and thereby
    said first information processing apparatus transmits the data to the second information processing apparatus at the determined transmission rate.

2. An information processing apparatus transmitting data to another information processing apparatus, or receiving the data from said other information processing apparatus, over a network, comprising:
    acquisition means for acquiring a first information on a transmission rate from said other information processing apparatus;
    reference value setting means for setting a maximum reference value of a transmission rate based on
    the first information acquired from said other information processing apparatus, and
    on a transmission rate of said information processing apparatus; and
    transmission rate controlling means for controlling a transmitting or receiving transmission rate of the data to or from said other information processing apparatus within a range of the maximum reference value set by said reference value setting means.

3. The information processing apparatus according to claim 2 wherein:
    when the data is sent to said other information processing apparatus, said reference value setting means selects a smaller one of a maximum transmission rate of a downstream transmission line of said other information processing apparatus, which is acquired as the first information, and a maximum transmission rate of an upstream transmission line of said information processing apparatus and sets the maximum reference value based on the selected transmission rate.

4. The information processing apparatus according to claim 3 wherein:
    said reference value setting means further selects a smaller one of a maximum bit rate of a reception capability of said other information processing apparatus, which is acquired as the first information, and a maximum bit rate of a transmission capability of said information processing apparatus and sets the maximum reference value based on the smaller of the selected bit rate or the selected transmission rate.

5. The information processing apparatus according to claim 2 wherein:
    when the data is received from said other information processing apparatus, said reference value setting means sets the maximum reference value of the transmission rate based on a smaller one of a maximum transmission rate of an upstream transmission line of said other information processing apparatus, which is acquired as the first information, and a maximum transmission rate of a downstream transmission line of said information processing apparatus.

6. The information processing apparatus according to claim 5 wherein:
    said reference value setting means further selects a smaller one of a maximum bit rate of a transmission capability of said other information processing apparatus, which is acquired as the first information, and a maximum bit rate of a reception capability of said information processing apparatus and sets the maximum reference value based on a smaller one of the selected bit rate and the selected transmission rate.

7. The information processing apparatus according to claim 2, wherein:
    said reference value setting means further sets a minimum reference value of the transmission rate; and
    said transmission rate control means controls the transmitting or receiving transmission rate of the data to or from said other information processing apparatus within a range between the maximum reference value and the minimum reference value set by said reference value setting means.

8. The information processing apparatus according to claim 2 wherein:
    when the transmission rate is decreased, said transmission rate control means changes a decreasing width in the transmission rate based on a proportion of the transmission rate to the maximum reference value.

9. The information processing apparatus according to claim 2, wherein:
    said transmission rate control means increases the transmission rate in such a way that time until the transmission rate reaches the maximum reference value becomes a given length of time.

10. An information processing method for use in an information processing apparatus for transmitting data to another information processing apparatus, or receiving the data from said other information processing apparatus, over a network, comprising:
    an acquisition step of acquiring first information on a transmission rate from said other information processing apparatus;
    a reference value setting step of setting a maximum reference value of a transmission rate based on the first information acquired from said other information processing apparatus and on a transmission rate of said information processing apparatus; and
    a transmission rate controlling step of controlling a transmitting or receiving transmission rate of the data to or from said other information processing apparatus within a range of the maximum reference value set by processing of said reference value setting step.

11. A computer-readable recording medium having recorded therein computer readable instructions that when executed by a processor controls an information processing apparatus for transmitting data to another information processing apparatus, or receiving the data from said other information processing apparatus, over a network, said processor when executing said instructions performing steps comprising:

an acquisition step of acquiring first information on a transmission rate from said other information processing apparatus;

a reference value setting step of setting a maximum reference value of a transmission rate based on the first information acquired from said other information processing apparatus and on a transmission rate of said information processing apparatus; and a transmission rate controlling step of controlling a transmitting or receiving transmission rate of the data to or from said other information processing apparatus within a range of the maximum reference value set by processing of said reference value setting step.

\* \* \* \* \*